(12) United States Patent
Day et al.

(10) Patent No.: US 11,920,453 B2
(45) Date of Patent: Mar. 5, 2024

(54) PRODUCED WATER BALANCE TOOL

(71) Applicant: BP Exploration Operating Company Limited, Middlesex (GB)

(72) Inventors: Stuart William Day, Middlesex (GB); Christopher Kylie Mair, Scotland (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 553 days.

(21) Appl. No.: 17/053,700

(22) PCT Filed: May 10, 2019

(86) PCT No.: PCT/EP2019/062060
§ 371 (c)(1),
(2) Date: Nov. 6, 2020

(87) PCT Pub. No.: WO2019/215332
PCT Pub. Date: Nov. 14, 2019

(65) Prior Publication Data
US 2021/0215030 A1    Jul. 15, 2021

(30) Foreign Application Priority Data

May 10, 2018   (EP) ..................................... 18171707

(51) Int. Cl.
*E21B 43/38*    (2006.01)
*E21B 43/16*    (2006.01)
(Continued)

(52) U.S. Cl.
CPC ............ *E21B 43/385* (2013.01); *E21B 43/16* (2013.01); *E21B 43/20* (2013.01); *G01V 3/38* (2013.01)

(58) Field of Classification Search
CPC ......... E21B 43/385; E21B 43/20; E21B 43/16
See application file for complete search history.

(56) References Cited

U.S. PATENT DOCUMENTS

| 2013/0098608 A1 | 4/2013 | Barnum et al. |
| 2013/0168097 A1 | 7/2013 | Janssen et al. |

(Continued)

FOREIGN PATENT DOCUMENTS

| WO | 2008/029124 A1 | 3/2008 |
| WO | 2009/123683 A2 | 10/2009 |

(Continued)

OTHER PUBLICATIONS

PCT/EP2019/062060 International Search Report and Written Opinion dated Jul. 17, 2020 (14 p.).

(Continued)

*Primary Examiner* — Robert E Fuller
(74) *Attorney, Agent, or Firm* — CONLEY ROSE, P.C.

(57) ABSTRACT

A method of dynamically allocating a total amount of produced water (PW) from a reservoir during enhanced oil recovery (EOR) via a low salinity or softened water EOR flood by receiving measurement data; receiving reservoir configuration information comprising: an EOR injection rate associated with one or more EOR injection zones, a disposal zone injection rate associated with one or more disposal injection zones, and a non-reinjection disposal rate associated with one or more non-reinjection disposal routes; determining a blending rate comprising at least a portion of the PW production rate and at least a portion of the low salinity or softened water injection rate to provide a blended injection fluid; blending at least a portion of the PW with at least a portion of the low salinity or softened water at the blending rate; and dynamically allocating the PW production rate among injection and/or non-reinjection routes.

11 Claims, 4 Drawing Sheets

(51) Int. Cl.
 *E21B 43/20* (2006.01)
 *G01V 3/38* (2006.01)

(56) References Cited

U.S. PATENT DOCUMENTS

| | | |
|---|---|---|
| 2013/0213892 A1 | 8/2013 | Henthorne |
| 2014/0290942 A1 | 10/2014 | Brodie et al. |
| 2014/0345862 A1 | 11/2014 | Jerauld et al. |
| 2015/0300149 A1 | 10/2015 | Collins et al. |
| 2016/0115743 A1 | 4/2016 | Reedy |

FOREIGN PATENT DOCUMENTS

| | | |
|---|---|---|
| WO | 2016/057014 A1 | 4/2016 |
| WO | 2017/003487 A1 | 1/2017 |
| WO | 2018/015223 A1 | 1/2018 |

OTHER PUBLICATIONS

Robbana, Enis et al., "Low Salinity Enhanced Oil Recovery—Laboratory to Day One Filed Implementation—LoSal EOR into the Clair Ridge Project," Society of Petroleum Engineers, Abu Dhabi International Petroleum Exhibition & Conference, Abu Dhabi, UAE, Nov. 11-14, 2012 (SPE 161750) (15 p.).

Office Action for Egyptian Application No. PCT 2062/2019 (5 p.).

Rygg, O.B. et al. "Dynamic Two-Phase Flow Simulator: A Powerful Tool for Blowout and Relief Well Kill Analysis," Society of Petroleum Engineers, Washington, DC, Oct. 4-7, 1992 (SPE 24578) (12 p.).

Argentine Office Action dated Jan. 11, 2013 for Argentine Application No. P190101252 (5 p.).

English Translation of Argentine Office Action dated Jan. 11, 2013 for Argentine Application No. P190101252 (2 p.).

PRODUCED WATER BALANCE TOOL

CROSS-REFERENCE TO RELATED APPLICATIONS

This application is a 35 U.S.C. § 371 national stage application of PCT/EP2019/062060 filed May 10, 2019, and entitled "Produced Water Balance Tool," which claims the benefit of European patent application Serial No. 18171707.5 filed May 10, 2018, and entitled "Produced Water Balance Tool," each of which is hereby incorporated herein by reference in its entirety for all purposes.

STATEMENT REGARDING FEDERALLY SPONSORED RESEARCH OR DEVELOPMENT

Not applicable.

TECHNICAL FIELD

This disclosure relates to a produced water balance tool for dynamic allocation of produced water (PW) during low salinity or softened water enhanced oil recovery (EOR), and for systems and methods employing the tool. More specifically, this disclosure relates to a produced water balance tool that enables disposal of a total amount of PW via reinjection and non-reinjection disposal routes, while maintaining EOR. Still more specifically, this disclosure relates to a tool for balancing the injection of PW and low salinity or softened water into a reservoir whereby the entirety of the PW is disposed of while maintaining enhanced oil recovery in one or more segments of the reservoir.

BACKGROUND

During the production of hydrocarbons, water is often produced along with the hydrocarbon components. This produced water (PW) often has a high salinity and can also include other dissolved components that make it unsuitable for reuse as an EOR injection fluid, due to fouling of membranes used to produce such EOR fluid. The dissolved components in the PW can be toxic and difficult to separate, thereby making disposal of the PW difficult and often economically unfeasible. The production and disposal of PW can be further complicated during oil production when reinjection of such fluids would interfere with a desired production scheme.

SUMMARY

Herein disclosed is a method of dynamically allocating a total amount of produced water (PW) from a reservoir during enhanced oil recovery (EOR) via a low salinity or softened water EOR flood, the method comprising: receiving measurement data associated with a reservoir, a PW, and a low salinity or softened water, wherein the measurement data comprises: a PW production rate from the reservoir, a low salinity or softened water injection rate, an injection water compositional envelope, and a total water injection rate; receiving reservoir configuration information comprising: one or more EOR injection zones, an EOR injection rate associated with each of the one or more EOR injection zones, one or more disposal injection zones, a disposal zone injection rate associated with each of the one or more disposal injection zones, one or more non-reinjection disposal routes, and a non-reinjection disposal rate associated with each of the one or more non-reinjection disposal routes; determining a blending rate comprising at least a portion of the PW production rate and at least a portion of the low salinity or softened water injection rate to provide a blended injection fluid, wherein the blending rate maintains a composition of the blended injection fluid within the injection water compositional envelope; blending at least a portion of the PW with at least a portion of the low salinity or softened water at the blending rate; and dynamically allocating the PW production rate among: (a) reinjection into the reservoir via the blending with the low salinity or softened water and injection into the one or more EOR injection zones, injection into the one or more disposal injection zones, or a combination thereof; (b) disposal through one or more non-reinjection disposal routes, or a combination thereof, wherein the dynamic allocation maintains the EOR injection rate, the disposal zone injection rate, and the non-reinjection disposal rate below predetermined thresholds, results in reinjection or non-reinjection disposal of the entire PW production rate, and meets a total voidage replacement rate whereby the sum total of the amount of water reinjected in (a) equals a voidage requirement.

Also disclosed herein is a system for dynamically allocating Produced Water (PW) for disposal in a reservoir during a low salinity waterflood, the system comprising: a memory storing a dynamic allocation tool; and a processor in signal communication with the memory, wherein the dynamic allocation tool, when executed on the processor, configures the processor to: receive reservoir data comprising a definition of an allocation of one or more segments of a reservoir as disposal segments and one or more segments of the reservoir as EOR waterflood segments, and total production rates of PW; input, into the dynamic allocation tool, data comprising the allocation of the one or more segments of the reservoir and the total production rates of PW; estimate low salinity enhanced oil recovery (EOR) profiles by segment for each of the one or more segments and an overall enhanced oil recovery; evaluate various reinjection and non-reinjection disposal routes and rates for the PW; and determine, on the basis of the estimation and the evaluation, one or more pathways for the PW, wherein the one or more pathways comprise: one or more reinjection disposal pathways selected from (a) blending with a low salinity stream produced via a low salinity apparatus to provide a low salinity EOR water for injection into one or more of the low salinity EOR segments; (b) reinjection via a disposal water into one or more of the disposal segments; or a combination thereof, and/or one or more non-reinjection pathways comprising (c) export in a produced oil; (d) discharge, or a combination thereof, wherein the rates of disposal of PW via (a), (b), (c), (d), or a combination thereof equals the total production rate of PW.

Further described herein is a system for simultaneously injecting a low salinity waterflood and produced water for disposal into a reservoir comprising a plurality of segments, the system comprising: a low salinity water production system configured to produce a low salinity water stream; a separation apparatus configured to separate a product oil for export from a field product comprising produced oil, a total PW for disposal, and gas; a low salinity injection manifold fluidly connected via a low salinity line with the low salinity water production system; a disposal injection manifold fluidly connected via a disposal line with the separation apparatus; one or more injection pumps fluidly connected with the low salinity injection manifold and the disposal injection manifold; a low salinity injection header fluidly connected with the one or more injection pumps, whereby a low salinity EOR stream comprising at least a portion of the low salinity water stream can be injected into one or more segments of the reservoir allocated for low salinity EOR; a disposal injection header fluidly connected with the one or more injection pumps, whereby a disposal stream comprising at least a portion of the total PW for disposal can be injected into one or more segments of the reservoir allocated for disposal; a blend line fluidly connecting the disposal line with the low salinity line, whereby a portion of the total PW for disposal can be blended with the low salinity water stream to provide the low salinity EOR stream prior to introduction into the low salinity manifold; and a control system comprising a processor with software configured to: determine injection rates per segment that meet voidage requirements and EOR injection while dynamically allocating the total PW for disposal via one or more reinjection pathways, one or more non-reinjection pathways, or a combination thereof, wherein the one or more reinjection pathways are selected from introduction into the disposal injection header via the disposal line, introduction into the low salinity header via the blend line, or a combination thereof.

While multiple embodiments are disclosed, still other embodiments will become apparent to those skilled in the art from the following detailed description. As will be apparent, certain embodiments, as disclosed herein, are capable of modifications in various aspects without departing from the spirit and scope of the claims as presented herein. Accordingly, the detailed description hereinbelow is to be regarded as illustrative in nature and not restrictive.

BRIEF DESCRIPTION OF THE DRAWINGS

The following figures illustrate embodiments of the subject matter disclosed herein. The claimed subject matter may be understood by reference to the following description taken in conjunction with the accompanying figures, in which:

DETAILED DESCRIPTION

Figure 1:
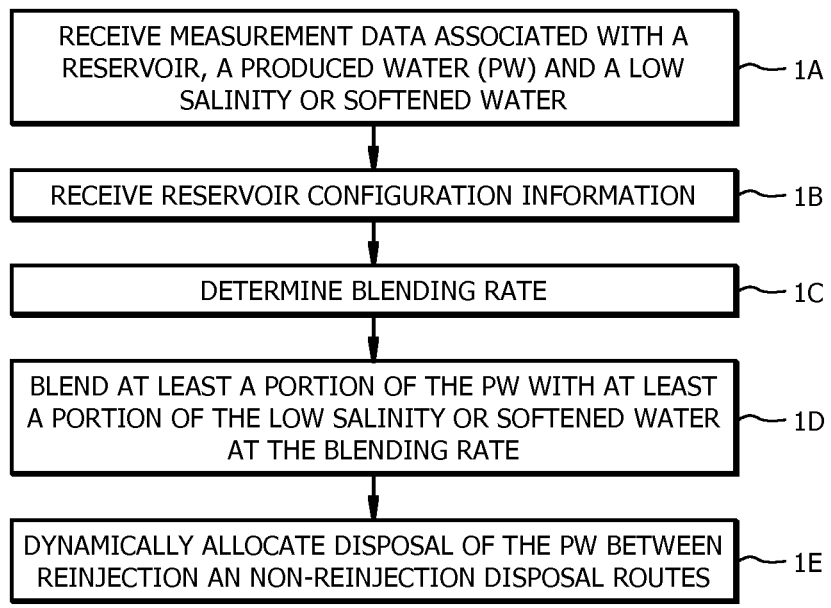
FIG. 1 is a block diagram of a method 1 of dynamically allocating a total amount of produced water from a reservoir during enhanced oil recovery via a low salinity or softened water EOR flood, according to an embodiment of this disclosure.

As utilized herein, "membrane" refers to elements for microfiltration (MF), ultrafiltration (UF), reverse osmosis (RO), or nanofiltration (NF). Technically, MF/UF elements can be classified as filters, but, for simplicity, are referred to herein as membranes.

"Low salinity" water is the water resulting from the removal of at least a portion of the salt (e.g., NaCl) or other total dissolved solids (TDS) from a high salinity feed water or PW. As used herein, low salinity water can be water having a salinity or TDS content of less than 8000, 9000, or 10000 ppm.

"Softened water" is the water resulting from the removal of at least some amount of hardness ions (e.g., multivalent cations including magnesium and calcium) from a high salinity feed water or PW. As utilized herein, softened water may be water having a hardness (expressed in grains per gallon (or ppm) as calcium carbonate equivalent) of less than or equal to about 1 grain per gallon (gpg) or 17.0 ppm (mg/L).

"High salinity feed water" or "feed water" is the feed water for a desalination or water softening plant and is typically, for a desalination plant, seawater (SW), estuarine water, aquifer water or mixtures thereof, but, for a water softening plant, may be or may further comprise produced water.

An "ultrafiltration (UF) filtration unit" comprises a pressure vessel containing one or more UF elements, for example, between 1 and 8 membrane elements, or between 4 and 8 UF membrane elements.

A "reverse osmosis (RO) filtration unit" comprises a pressure vessel, alternatively called a housing, containing one or more RO membrane elements, for example between 1 and 8 RO membrane elements, or between 4 and 8 RO membrane elements.

A "nanofiltration (NF) filtration unit" comprises a pressure vessel containing one or more NF elements, for example between 1 and 8 membrane elements, or between 4 and 8 NF membrane elements.

A reverse osmosis (RO) "stage" or "array" of a desalination plant is a group of RO filtration units connected together in parallel. Similarly, a nanofiltration (NF) "stage" or "array" of a desalination plant is a group of NF filtration units connected together in parallel.

"Connate water" is the water present in the pore space of an oil-bearing layer of a reservoir.

"Aqueous drive fluid" or "drive fluid" is an aqueous fluid that may be injected into an injection well after injection of a low pore volume (PV) slug of the low salinity or softened EOR injection water.

"Slug" is a low pore volume of a fluid that is injected into an oil-bearing layer of a reservoir. The values of pore volumes given for the slugs of low salinity injection water are based on the swept pore volume (PVR) of the layer(s) of reservoir rock.

"TDS content" is the total dissolved solids content of an aqueous stream and typically has units of mg/L.

The unit "ppmv" is parts per million on a volume basis and is equivalent to the unit "mg/L". Unless noted otherwise, when utilized herein, "ppm" means "ppmv".

A problem associated with low salinity or softened water enhanced oil recovery (EOR) or waterflooding is the disposal of substantial volumes of PW, particularly when legislation limits overboarding and/or when the costs and time associated with obtaining permits for overboarding are overly restrictive.

Desalination or water softening techniques may yield water having a lower than optimal salinity for continuous injection into an oil bearing reservoir. Indeed, the desalinated or softened water may be damaging to the oil-bearing rock formation of the reservoir and may inhibit oil recovery, for example, by causing swelling or mobilization of clays such that the clays block the formation. Thus, there is an optimal salinity for the injection water that provides the benefit of enhanced oil recovery whilst mitigating the risk of formation damage, and, the optimum salinity may vary within a single reservoir owing to the rock composition varying spatially across a reservoir (both in a vertical and a transverse direction). Typically, where an oil-bearing formation comprises rock that contains high levels of swelling clays, formation damage may be avoided, while still releasing oil from the formation, when the injection water has a total dissolved solids content (TDS) in the range of 200 to 10,000 ppm and the ratio of the concentration of multivalent cations in the low salinity injection water to the concentration of multivalent cations in the connate water of the reservoir is less than 1, for example, less than 0.9.

Disposal of produced water may thus include reinjection into the reservoir as a component of a blended stream comprising low salinity or softened water and an amount of produced water suitable to provide a blended low salinity or softened water EOR stream having a desired or 'target' salinity or TDS for EOR. As the amount of produced water and the composition thereof will change during various stages of EOR from a reservoir, there is a need for systems, methods, and tools for dynamically allocating PW disposal during low salinity or softened water waterflooding.

The present disclosure relates to a 'tool' that can be implemented as software, and module, an application, or the like for evaluating different ways of disposing of a produced water (PW) when injecting a low salinity injection water and/or a softened water into a reservoir for enhanced oil recovery (EOR), and a system and method employing the tool. The herein-disclosed PW balance tool balances a voidage injection rate (total injection water requirement), produced water re-injection (PWRI) rate, and low salinity and/or softened water injection rate (which equals the voidage replacement rate less the PWRI rate), and provides for allocation of the totality of the produced water via various reinjection and non-reinjection disposal routes. As the amount of PW for disposal in a reservoir and the composition thereof will vary over time, typically increasing over time, dynamic allocation as per this disclosure can enable management of the disposal of varying amounts of PW throughout a process of EOR via low salinity or softened water waterflooding.

In embodiments, the tool utilized for shorter term dynamic allocations of PW. In embodiments, the tool is primarily a predictive tool that enables longer term predictive planning or 'forecasting' of what choices can be made in the future to dispose of produced water. By estimating the impact of development choices on produced water disposal and therefore on EOR recovery, the tool can, in embodiments, allow a user to test alternatives and make informed decisions. In embodiments, the herein-disclosed tool is designed to look ahead for a longer term (e.g., years) to understand the impact of long term development choices (including, but not limited to, where and when to put wells, which segments to use for PW disposal versus EOR injection, etc.). In embodiments, the tool operates as an extension of a reservoir simulation model traditionally used by a reservoir management team as a long-term forecasting and decision-making tool.

Description of a method of this disclosure will now be made with reference to FIG. 1, which is a block diagram of a method 1 of dynamically allocating a total amount of produced water from a reservoir during enhanced oil recovery via a low salinity or softened water EOR flood. The method comprises receiving measurement data associated with a reservoir, a PW, and a low salinity or softened water at 1A, receiving reservoir configuration information at 1B, determining a blending rate comprising at least a portion of the PW production rate and at least a portion of the low salinity or softened water injection rate to provide a blended injection fluid at 1C, blending at least a portion of the PW with at least a portion of the low salinity or softened water at the blending rate at 1D, and dynamically allocating the total amount of PW among various reinjection and non-reinjection disposal routes at 1E. Although referred to as "measurement data" associated with a reservoir, it should be understood that the "measurement data" received can comprise real data, modeled data, predicted/forecast data (e.g., from a reservoir simulation model), or a combination thereof, associated with a reservoir. Dynamic allocations may utilize real and/or modeled data, while longer term predictions may utilize predicted and/or modeled data (e.g., the predicted data may be modeled). Additionally, it should be understood that, in embodiments, a high salinity water other than PW (e.g., seawater) may be utilized to produce a 'blended' injection fluid, and the PW is disposed of via routes other than blending with at least a portion of the low salinity or softened water. The herein-disclosed tool thus also enables disposal of PW in embodiments via the other routes noted herein (e.g., overboarding, injection into a dedicated PW injection well, etc.) where PW blending with at least a portion of the low salinity or softened water to produce an EOR injection fluid is essentially zero.

Method 1 comprises receiving measurement data (e.g., real, predicted/forecast, and/or modeled data, as noted above) associated with a reservoir, a PW, and a low salinity or softened water at 1A. The measurement data may include a PW production rate from the reservoir, a low salinity or softened water EOR injection rate, an EOR injection water compositional envelope, a total water injection rate, a salinity of the PW, or a combination thereof.

Method 1 further comprises receiving reservoir configuration information at 1B. The reservoir configuration information may include assignment of one or more zones or compartments of the reservoir as EOR injection zones, an EOR injection rate associated with each of the one or more EOR injection zones, assignment of one or more zones or compartments of the reservoir as one or more disposal injection zones, a disposal zone injection rate associated with each of the one or more disposal injection zones, information regarding one or more potential non-reinjection disposal routes, and a non-reinjection disposal rate associated with each of the one or more non-reinjection disposal routes. For example, the herein-disclosed tool, system or method may be utilized for or with any reservoir that is divided into compartments, segments, or zones (e.g., physically compartmentalized, or comprising compartments that are 'constructed' or virtual) for injection of a slug of low salinity water or softened water in secondary recovery mode followed by injection of produced water, injection of low salinity water or softened water in tertiary recovery mode after injection of PW, or for disposal of PW. The tool may be utilized to test sensitivities and for scenario planning, and may lead to the development of alternative injection/disposal strategies and perhaps influence how the field (e.g., the reservoir) is developed in terms of numbers of injections in each compartment or zone of the reservoir, the sizes of pumps/manifolds, etc. In embodiments, analysis via the herein-disclosed tool is utilized to design a facilities configuration for EOR flooding.

Method 1 further comprises determining a blending rate comprising at least a portion of the PW production rate and at least a portion of the low salinity or softened water injection rate to provide a blended injection fluid at 1C. The blending rate can be selected to maintain a composition of the blended injection fluid within the EOR injection water compositional envelope. Compositions within the operating envelope for a segment or region of the reservoir are those predicted to achieve enhanced oil recovery (EOR) from each region of the reservoir while avoiding, reducing, or minimizing the risk of formation damage in the region of the reservoir. For example, the blending rate may be determined such that the blended water or blended injection fluid has a desired salinity, TDS, concentration of one or more cations, or combination thereof equal to a target value therefor. For example, in embodiments, the blending rate provides for a target salinity in the blended injection fluid. In embodiments, as discussed further hereinbelow, the amount of PW is such that disposal of the entirety of the PW employs blending at a blending rate whereby the blended injection fluid has a desired salinity, TDS, concentration of one or more cations, or combination thereof greater than the target value therefor, but less than a threshold value above which EOR is compromised. In embodiments in which the amount of PW is such that disposal via the available disposal routes (including reinjection and non-reinjection disposal routes detailed hereinbelow) results in blending at a blending rate whereby the blended injection fluid has a salinity, TDS, concentration of one or more cations, or combination thereof greater than the threshold value therefor, rather than compromise the EOR in all of the one or more EOR segments of the reservoir, one or more of the segments of the reservoir assigned for EOR may be reassigned for disposal, and the excess PW reinjected via a PWRI pathway into the one or more EOR segments reassigned as disposal segment(s). In such a manner, EOR can be continued in the remaining segments assigned to EOR injection, and the totality of the PW can be disposed of via the various disposal pathways.

Method 1 further comprises dynamically allocating the total amount of PW among various reinjection (a) and non-reinjection (b) disposal routes at 1E. Reinjection disposal routes (a) include reinjection into the reservoir via the blending with the low salinity or softened water and injection into the one or more EOR injection zones, injection into the one or more disposal injection zones, or a combination thereof. The amount of PW reinjected into the reservoir in (a) can thus be divided among one or more of: (c) an amount of PW blended with a stream of the low salinity or softened water to provide a low salinity or softened water EOR stream having a total dissolved solids (TDS) content and ionic composition within a target salinity and target composition (e.g., within a target compositional envelope) for EOR and introduced as a slug of low salinity or softened water EOR into one or more segments of the reservoir allocated for secondary or tertiary low salinity or softened water EOR; (d) an amount of PW utilized as a drive and/or pre-flush fluid that is injected into one or more segments of the reservoir allocated for low salinity or softened water EOR subsequent and/or prior to, respectively, the injection of a slug of low salinity or softened water EOR thereto; (e) an amount of PW utilized in secondary recovery mode via injection into one or more segments of the reservoir allocated for tertiary low salinity or softened water EOR prior to injection of a slug of low salinity or softened water EOR thereto in tertiary recovery mode; (f) an amount of PW injected via a disposal stream into one or more segments of the reservoir allocated for PW disposal; and (g) an amount of PW blended with a stream of the low salinity or softened water to provide a low salinity or softened water EOR stream having a TDS and ionic composition within a threshold salinity and threshold composition (e.g., within a threshold compositional envelope) for EOR, and introduced as a slug of low salinity or softened water EOR into one or more segments of the reservoir allocated for secondary or tertiary low salinity or softened water EOR; and/or (h) an amount of PW blended with a stream of the low salinity or softened water to provide a low salinity or softened water EOR stream having a salinity above the threshold salinity for EOR, and introduced into one or more segments of the reservoir. The amounts of PW allocated to each of (c), (d), (e), (f), (g), and/or (h) can be maintained below injection limits for the associated one or more segments thereof.

Non-reinjection disposal routes (b) include (i) export in the produced oil, (j) overboarding, or a combination thereof. The amount of PW present in the produced oil for export in (i) can be maintained below a maximum export (e.g., a base solids and water, BS&W) limit, and the amount of PW overboarded in (j) can be maintained below a maximum overboard limit. For example, the BS&W limit may be less than about 3 volume percent (vol. %) water or less than about 5 volume percent (vol. %) water, or the overboard limit may be about 20.0 thousand stock tank barrels per day (mstb/d). Although referred to as export in the produced oil, in embodiments, (i) may include or consist of 'export' of PW via introduction into a PW/aquifer of a different formation. Overboarding in (j) comprises surface discharge of water for disposal (e.g., into the sea and/or rivers).

To provide a more detailed description of the various reinjection and non-reinjection disposal routes in 1E, description of an exemplary facilities configuration will now be made with reference to FIG. 2, which is a schematic of a system or facilities configuration I for which the herein-disclosed PW balance tool can be utilized to allocate PW disposal. Facilities configuration I comprises desalination or water softening apparatus or plant 30, low salinity or softened water line 35, produced water line 83, suction manifolds including low salinity or softened water manifold 40 and disposal manifold 50, injection pumps 60, injection headers including low salinity or softened water header 45 and disposal header 55, reservoir 65 comprising one or more compartments or segments assigned for EOR injection and associated low salinity or softened water injectors, one or more compartments, segments, or zones assigned for disposal and associated disposal water injectors, and associated with one or more injection wells and one or more production wells, separator 75, and PW treatment apparatus 80.

Desalination or water softening apparatus 30 is operable to produce a desalinated or softened water from a feed water in feed water line 21. The low salinity or softened water can be a low salinity water produced via reverse osmosis, nanofiltration, or a combination thereof, or a softened water produced via nanofiltration (e.g., via a sulfate reduction plant, SRP), hardness ion precipitation (e.g., lime treatment), ion exchange, or a combination thereof.

In embodiments, desalination or water softening apparatus 30 comprises reverse osmosis (RO) units, nanofiltration (NF) units, or a combination thereof. For example, in embodiments, desalination or water softening apparatus 30 comprises one or more RO/NF banks, each of the one or more RO/NF banks comprising a plurality of RO units, each RO unit comprising a plurality of RO membranes, and a plurality of NF units, each NF units comprising a plurality of NF membranes. The UF filters may be referred to in some contexts, depending on the specific construction, as UF 'membranes'. An RO stream can be removed from desalination or water softening apparatus 30 via RO line 32, and an NF stream can be removed from desalination or water softening apparatus 30 via an NF line 33. One or more reject line(s) 29 can be operable to remove retentate from the RO/NF banks.

Figure 3:
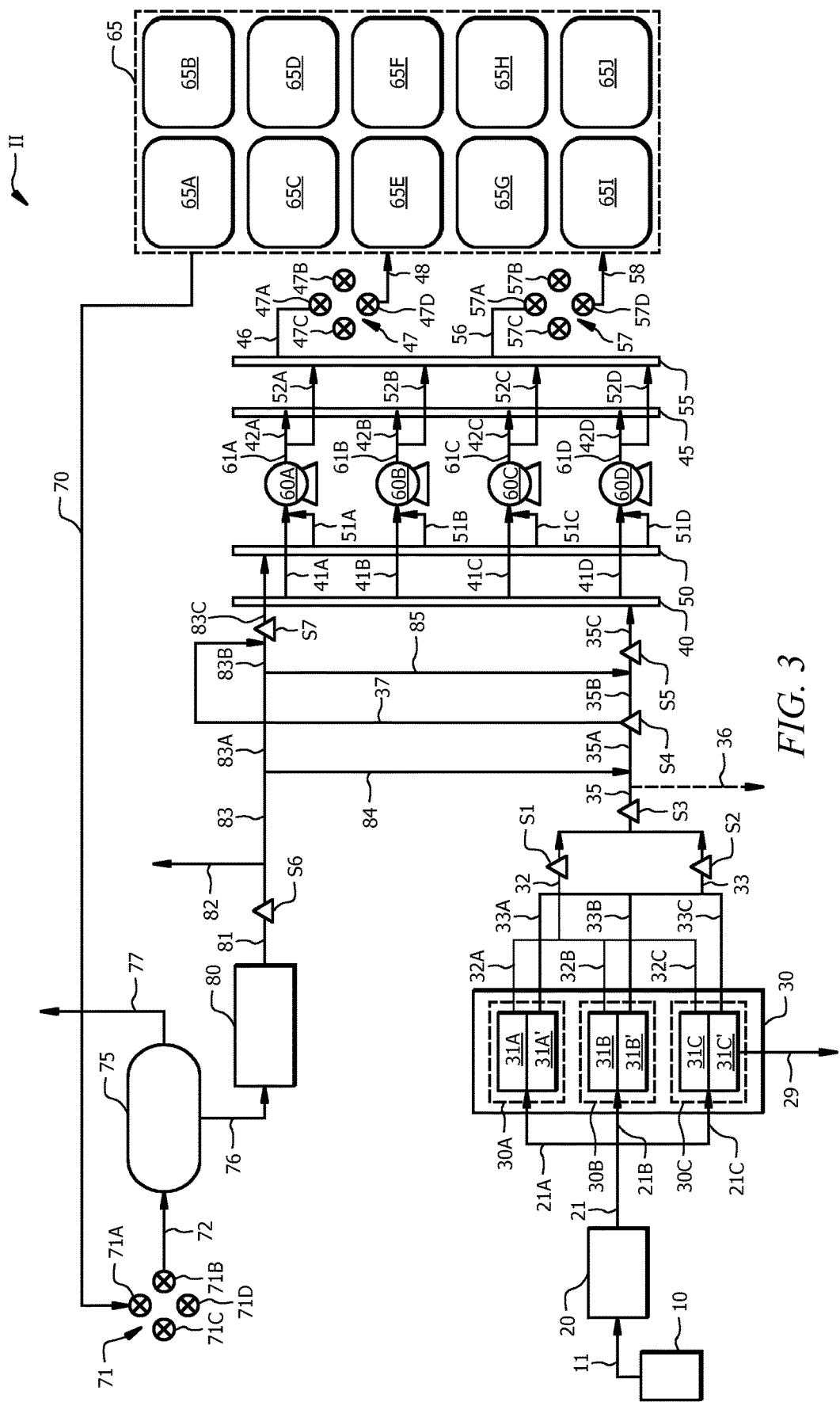
FIG. 3 is a schematic of a facilities configuration II for which the herein-disclosed PW balance tool can be utilized to allocate PW disposal, according to another embodiment of this disclosure.

As another example, in the embodiment of FIG. 3, which is a schematic of a facilities configuration II for which the herein-disclosed PW balance tool can be utilized to allocate PW disposal according to another embodiment of this disclosure, desalination or water softening apparatus 30 comprises a desalination system comprising three RO/NF banks 30A, 30B, and 30C, each of which is configured to provide, from feed water in feed lines 21A, 21B, and 21C, respectively, an RO or permeate stream in RO lines 32A, 32B, and 32C, respectively, which are combined to provide the RO permeate stream in RO line 32, and an NF or permeate stream in NF lines 33A, 33B, and 33C, respectively, which are combined to provide an NF permeate stream in NF line 33. Each RO/NF bank 30A, 30B, and 30C can comprise a plurality of RO units or groups thereof, a plurality of NF units or groups thereof, or a combination thereof. For example, in the embodiment of FIG. 3, RO bank 30A comprises RO units/groups 31A and NF units/groups 31A', RO bank 30B comprises RO units/groups 31B and NF units/groups 313, and RO bank 30C comprises RO units/groups 31C and NF units/groups 31C'. Without limitation, in embodiments, the RO units may provide RO water having a salinity or total dissolved solids (TDS) of less than or equal to about 300, 250, 200 ppm. Without limitation, in embodiments, the NF units may provide NF water having a salinity or total dissolved solids (TDS) of less than or equal to about 30,000, 25,000, or 20,000 ppm. If the amount of PW (e.g., in line 70, discussed hereinbelow) is high, the low salinity or water softening apparatus 30 may be operated to produce more RO permeate and less NF permeate water, thus allowing blending of the RO water with a greater amount of PW, as described below, while maintaining a salinity or TDS of the blended EOR stream within a target or threshold compositional envelope.

In alternative embodiments, desalination or water softening apparatus 30 comprises a sulfate reduction plant (SRP) for the production of softened water. The SRP may comprise a plurality of NF units to selectively remove multivalent ions to produce a sulfate reduced water, as known in the art.

In embodiments where desalination or water softening apparatus 30 comprises a sulfate reduction plant (SRP) or a desalination plant (as described hereinabove with reference to FIG. 3), an upstream filter, such as an ultrafiltration apparatus 20 can be utilized to remove large particulates from a feed water 11, such as sea water (SW) provided via SW lift 10, to provide the feed stream introduced into desalination or water softening apparatus 30 via feed water inlet line 21. In membrane desalination or water softening systems, the feed water in feed water inlet line 21 can comprise sea water (SW), brackish water, aquifer water, or a combination thereof. The UF apparatus 20 can comprise any UF units and membranes may be any known to those of skill in the art. In embodiments, the UF units or membranes are as described in International Patent No. PCT/EP2017/067443 and published as WO/2018/015223, the disclosure of which is hereby incorporated herein in its entirety for purposes not contrary to this disclosure.

In embodiments, desalination or water softening apparatus 30 comprises a water softening apparatus operable via ion exchange technology. Such ion exchange technology is known in the art, for example, as described in International Patent Application No. PCT/US2009/001816 and published as WO/2009/123683, the disclosure of which is hereby incorporated herein in its entirety for purposes not contrary to this disclosure. Although described therein with reference to ion exchange and the regeneration of ion exchange resins via a produced brine, when available, sodium chloride (NaCl) or another Group IA halide salt may be utilized to regenerate the ion exchange resins, in embodiments.

In alternative embodiments, desalination or water softening apparatus 30 comprises an apparatus configured for the production of softened water via the removal of hardness (e.g., multivalent cations, such as magnesium and calcium) from the feed water in feed water line 21 via precipitation. For example, desalination or water softening apparatus 30 may be operable to provide softened water via 'lime softening', wherein the addition of lime (e.g., calcium hydroxide) is utilized to remove hardness from the feed water via precipitation. The addition of lime (or other alkaline material) can be utilized to raise the pH such that the equilibrium of carbonate species in the water is shifted whereby dissolved carbon dioxide is converted to bicarbonate and then carbonate, resulting in the precipitation of calcium carbonate. Magnesium hydroxide can also be precipitated, and lime softening may also provide for the removal of other multivalent cations, such as iron, from the feed water. The precipitated salts may be flocculated and separated from the softened water.

In embodiments utilizing ion exchange or precipitation of hardness ions (e.g., via lime softening) to provide softened water for EOR, produced water may be utilized as the feed water (or at least a component thereof) in feed water line 21, thus providing another disposal means for the PW. This may provide for a benefit over membrane desalination or membrane softening (e.g., SRP), in embodiments, as trace amounts of oil in the PW will generally foul such membranes. The ability to produce the softened water from the PW may provide greater flexibility in disposing of the PW.

The capacity for desalination or water softening apparatus or plant 30 can be determined by the overall PW disposal rate, the low salinity or softened water injection rate (e.g., injectivity requirements for the low salinity or softened water injection wells in the one or more low salinity or softened water EOR segments of the field), and (for offshore plants) by weight and space constraints. As discussed below, since the totality of the injected water is either produced water or low salinity or softened EOR water, the difference between the total water injection rate (defined by reservoir voidage requirements) and PW reinjection rates defines the profile for make-up low salinity or softened water (e.g., RO water). The peak in this profile may be utilized as a basis to determine the effective size of the desalination or water softening plant 30, where some amount of contingency or slug capacity can be included (e.g., plus or minus a 10% spare contingency).

An excess low salinity or softened water dump line 36 may be utilized to dispose of excess low salinity or softened water. In embodiments, a dump line 36 may be utilized to dump excess RO water from RO line 32, and another dump line 36 may be utilized to dump excess NF water from NF line 33. In embodiments, the excess RO/NF water disposed of via RO/NF dump line 36 can be dumped to the sea. The amount of the NF permeate stream 33 or of the RO permeate 32 available for blending to form the blended low salinity or softened water EOR injection water stream(s) may be rapidly adjusted (in real time) by discharging varying amounts of the NF permeate stream 33 or RO permeate stream 32 from the desalination plant 30, for example, into a body of water (e.g., the ocean), via an NF permeate, RO permeate, or combined RO/NF permeate "dump line" 36, provided with a "dump valve". The dump valve can be an adjustable valve (e.g., a throttle valve) that may be set to various positions (e.g., between a fully closed and fully open position) to adjust the amounts of NF permeate, RO permeate, or RO/NF permeate discharged from the system.

If the discharge of excess NF permeate, excess RO permeate, or excess RO/NF permeate continues for a prolonged period of time, for example, hours or days, then a control unit (e.g., control unit 90, discussed hereinbelow) may make adjustments to the desalination or softened water production plant 30 by taking one or more of the NF units of an NF array or one or more of the RO units of an RO array off-line thereby reducing the production capacity of NF permeate or RO permeate, respectively.

At least a portion of the produced water in PW line 83 can be blended with the low salinity or softened water in low salinity or softened water line 35 via a PW blend line 84, a PW dump to low salinity or softened water header line 85, or both. At least a portion of the low salinity or softened water in low salinity or softened water line 35 can be introduced into PW line 83 via low salinity or softened water makeup line 37. Thus, a portion of the low salinity or softened water in line 35 can be blended with the PW in line 83 via PW blend line 84, to provide low salinity or softened water stream 35A and PW or disposal water stream 83A, a portion of the low salinity or softened water in stream 35A can be introduced into PW line 83 via low salinity or softened water makeup line 37, to provide low salinity or softened water stream 35B and PW or disposal water stream 83C, a portion of the PW in line 83 can be blended via line 85 with the low salinity or softened water stream 35B, to provide the low salinity or softened water in stream 35C and PW or disposal water stream 83B, or a combination thereof. The low salinity or softened water stream 35C can be introduced into low salinity or softened water suction manifold 40, and the PW or disposal stream 83C can be introduced into disposal suction manifold 50. Albeit unlikely, feed water in line 21 may be introduced into line 83 as needed to meet voidage requirements, e.g., sea water can be injected into the reservoir 65 along with the disposal water comprising PW, in embodiments.

Injection pumping apparatus 60 comprises a plurality of injection pumps operable to pump low salinity or softened water 35C introduced via line(s) 41 from low salinity or softened water suction manifold 40 into low salinity or softened water injection header 45 via line(s) 42 or into disposal injection header 55 via line(s) 52, or to pump disposal water 83C introduced via line(s) 51 from disposal suction manifold 50 into low salinity or softened water injection header 45 via line(s) 42 or into disposal injection header 55 via line(s) 52. Desirably, the pumping apparatus comprises sufficient pumps such that injection from either manifold to either header is not limited by the available pumping capacity. In the embodiment of FIG. 3, facilities configuration II comprises four injection pumps. 60A, 60B, 60C, and 60D. Injection pump 60A is configured to pump water from stream 35C introduced thereto via line 41A from low salinity or softened water manifold 40 into low salinity or softened water injection header 45 via line 42A or into disposal injection header 55 via line 52A, or to pump disposal water from stream 83C introduced via line 51A from disposal suction manifold 50 into low salinity or softened water injection header 45 via line 42A or into disposal injection header 55 via line 52A; injection pump 60B is configured to pump water from stream 35C introduced thereto via line 41B from low salinity or softened water manifold 40 into low salinity or softened water injection header 45 via line 42B or into disposal injection header 55 via line 52B, or to pump disposal water from stream 83C introduced via line 51B from disposal suction manifold 50 into low salinity or softened water injection header 45 via line 42B or into disposal injection header 55 via line 52B; injection pump 60C is configured to pump water from stream 35C introduced thereto via line 41C from low salinity or softened water manifold 40 into low salinity or softened water injection header 45 via line 42C or into disposal injection header 55 via line 52C, or to pump disposal water from stream 83C introduced via line 51C from disposal suction manifold 50 into low salinity or softened water injection header 45 via line 42C or into disposal injection header 55 via line 52C; injection pump 60D is configured to pump water from stream 35C introduced thereto via line 41D from low salinity or softened water manifold 40 into low salinity or softened water injection header 45 via line 42D or into disposal injection header 55 via line 52D, or to pump disposal water from stream 83C introduced via line 51D from disposal suction manifold 50 into low salinity or softened water injection header 45 via line 42D or into disposal injection header 55 via line 52D.

Water may be introduced from low salinity or softened water injection header 45 via line 46 and a plurality of low salinity or softened water injectors into one or more segments of a reservoir 65, and from disposal header 55 via line 56 and a plurality of disposal injectors into one or more segments of the reservoir 65. For example, as indicated in the embodiment of FIG. 3, low salinity or softened water may be introduced via line 46 and low salinity or softened water injection header 45 and low salinity or softened water injectors 47A, 47B, 47C, and/or 47D and line (s) 48 into one or more segments of reservoir 65, and disposal water may be introduced via line 56 from disposal header 55 and disposal injectors 57A, 57B, 57C, and/or 57D and line (s) 58 into one or more segments of the reservoir 65. For example, reservoir 65 may comprise any number of segments, such as segments 65A, 65B, 65C, 65D, 65E, 65F, 65G, 65H, 65I and 65J of the embodiment of FIG. 3. The low salinity or softened water may be introduced into one or more segments of the reservoir 65 allocated for EOR, while the disposal water may be introduced into one or more segments of the reservoir 65 allocated for disposal (or into one or more segments of the reservoir allocated for EOR, when the PW or disposal water is utilized as a pre- or post-flush fluid). The reservoir 65 can comprise any number of segments allocated for EOR and any number of segments allocated for disposal, and the allocation thereof may change in response to the dynamic PW balance described herein.

Desirably, the one or more disposal regions or segments of reservoir 65 are separated from the one or more low salinity waterflood segments, as it is undesirable for the PW to pass from a disposal segment to a low salinity waterflood segment and thus negatively influence the EOR effectiveness. For example, the one or more disposal regions or segments can be physically separated by various geological features (e.g., impermeable boundaries or layers) and/or spatially separated to provide a resistance to flow from one segment to another. One or more segments 65A-65I of reservoir 65 may be utilized for a secondary low salinity or softened water EOR, one or more segments 65A-65I of reservoir 65 may be utilized for produced water disposal, one or more segments 65A-65I of reservoir 65 may be utilized for a tertiary EOR waterflood following a secondary PW flood, or a combination thereof. The segments of reservoir 65 may be ranked for injection of low salinity or softened water in secondary mode, injection of low salinity or softened water in tertiary mode (e.g., following injection of PW), or for PW disposal depending on the amount of oil in place in each segment, and on the low salinity or softened water waterflood response for each segment, e.g., on how well the reservoir rock responds to a low salinity or softened water waterflood in core flood experiments. Segments may be assigned initially for secondary EOR, tertiary EOR, or disposal with an overall objective of maximizing low salinity or softened water EOR incremental oil recovery while operating within system constraints, including disposal of all of the PW. As described in Great Britain Patent Application No. GB 1714649.9, the disclosure of which is hereby incorporated herein by reference in its entirety for purposes not contrary to this disclosure, the salinity of a low salinity or softened EOR injection water may be controlled during a low salinity waterflood for an oil reservoir when the formation rock surrounding a first injection well has different chemical characteristics to the formation rock surrounding a second injection well resulting in different risks of formation damage (e.g., permeability loss) associated with injecting a low salinity or softened EOR injection water from the injection wells into the reservoir. In such embodiments, the concentration of one or more individual ions or types of individual ions in the low salinity or softened EOR injection water(s) injected into injection wells 47 penetrating different segments or regions of a reservoir 65 where the regions have different rock characteristics associated with different risks of formation damage may be controlled/adjusted.

As the salinity and TDS of the PW may be relatively higher at the start of operation (as the salinity of the connate water may be relatively high), and reduce over time as low salinity or softened water breaks through at the production wells in segments of the field in which there is a secondary low salinity or softened water waterflood or a tertiary low salinity or softened water waterflood, the amount of PW that can be disposed of via blending with the low salinity or softened water may increase over time, and the herein-disclosed dynamic PW allocation enable effective disposal of the varying amounts of PW.

Field production comprising oil, produced water, and/or gas extracted from reservoir 65 via one or more production wells can be introduced via line(s) 72 into a separator 75. Separator 75 may be a high pressure/low pressure (HP/LP) separator configured to separate product oil, which may be sent via line 77 for export, from produced water, which may be sent via line 76 to a PW treatment unit or apparatus 80. Treated PW may be removed from PW treatment unit or apparatus 80 via treated PW line 81. For example, as indicated in the embodiment of FIG. 3, product comprising oil, PW, and gas is introduced via line 70 and production wells 71A, 71B, 71C, and 71D into HP/LP separator 75. Separator 75 separates oil export in line 77 from a majority of the PW, which is extracted from separator 75 via line 76. The PW in line 76 may be treated via passage through PW treatment apparatus 80, for example to remove oil therefrom. In embodiments, PW overboarding includes treatment of the PW to be overboarded for the removal of oil therefrom. PW treatment apparatus 80 may be a standard water treatment package configured to remove oil from PW to meet environmental discharge requirements. Such legislation can vary by geographical region, for example, less than 40 ppm oil in water.

As discussed further hereinbelow, allocation of the PW may include overboarding of a portion of the PW in treated PW line 81 via overboarding line 82, and the remainder of the PW in line 83 may be reinjected into the reservoir 65 via the low salinity or softened water (e.g., via blending with the low salinity or softened water in line 35 via PW blend line 84, the PW dump to low salinity or softened water header line 85, or both) or as disposal water.

Referring back to FIG. 1, dynamically allocating the PW production rate between reinjection and non-reinjection disposal routes at 1E can comprise (a) reinjection into the reservoir 65 via the blending with the low salinity or softened water in line 35 via lines 84 and/or 85 and injection into one or more segments of the reservoir assigned for EOR, or reinjection as disposal water into one or more segments of the reservoir 65 assigned for disposal; (b) disposal through one or more non-reinjection disposal routes, or a combination thereof. When a portion of the low salinity or softened water is produced from the PW, the amount of PW disposed of via production of low salinity or softened water therefrom is intended to be included herein in (a) reinjection into the reservoir 65 via the blending with the low salinity or softened water in line 35 via lines 84 and/or 85 and injection into one or more segments of the reservoir assigned for EOR, or reinjection as disposal water into one or more segments of the reservoir 65 assigned for disposal.

In embodiments, the disposal through one or more non-reinjection routes in (b) comprises (i) export in the produced oil via line 77, (j) overboarding via line 82, or a combination thereof. The amount of PW disposed of via (i) export in the produced oil via line 77 and/or (j) overboarding via line 82 may be maintained below threshold values. As noted herein, non-reinjection disposal routes can also include disposal into an aquifer or shallower formation via a disposal well. Overboarding may be undesirable for environmental reasons, and may be maintained below a maximum permitted overboarding rate.

The amount of PW reinjected into the reservoir in (a) can be divided among one or more of: (c) an amount of PW blended with a stream of the low salinity or softened water to provide a low salinity or softened water EOR stream having a salinity less than a target salinity for EOR and introduced as a slug of low salinity or softened water EOR into one or more segments of the reservoir allocated for secondary or tertiary low salinity or softened water EOR; (d) an amount of PW utilized as a drive and/or pre-flush fluid that is injected into one or more segments of the reservoir allocated for low salinity or softened water EOR subsequent and/or prior to, respectively, the injection of a slug of low salinity or softened water EOR thereto; (e) an amount of PW utilized in secondary recovery mode via injection into one or more segments of the reservoir allocated for tertiary low salinity or softened water EOR prior to injection of a slug of low salinity or softened water EOR thereto in tertiary recovery mode; (f) an amount of PW injected via a disposal stream into one or more segments of the reservoir allocated for PW disposal; and/or (g) an amount of PW blended with a stream of the low salinity or softened water to provide a low salinity or softened water EOR stream having a salinity less than a threshold salinity for EOR, and introduced as a slug of low salinity or softened water EOR into one or more segments of the reservoir allocated for secondary or tertiary low salinity or softened water EOR; and (h) an amount of PW blended with a stream of the low salinity or softened water to provide a low salinity or softened water EOR stream having a salinity above the threshold salinity for EOR, and introduced into one or more segments of the reservoir; wherein the amounts of PW allocated to each of (c), (d), (e), (f), (g), and/or (h) are maintained below injection limits for the associated one or more segments thereof.

The dynamic allocation maintains the EOR injection rate, the disposal zone injection rate, and the non-reinjection disposal rate below predetermined thresholds, results in reinjection or non-reinjection disposal of the entire PW production rate, and meets a total voidage replacement rate whereby the sum total of the amount of water reinjected in (a) equals a voidage requirement.

Thus, the production rate of PW in line 72 is allocated among a rate of export with the export oil in line 77, a rate of overboarding via overboarding line 82, and a rate of PW reinjection (PWRI) into reservoir 65. The rate of PWRI in line 83 is divided among a rate of blending with the low salinity or softened water in blend line 84, a rate of combining with the low salinity or softened water via dump line 85 and/or the rate of reinjection into reservoir 65 of PW as disposal water in 83B.

Dynamic allocation at 1E may prioritize allocation of the produced water firstly to (i) export in the produced oil, whereby the maximum amount of PW allowable is exported with the product oil. Dynamic allocation at 1E may prioritize allocation of the produced water lastly to (h), whereby blending of an amount of PW with a stream of the low salinity or softened water to provide a low salinity or softened water EOR stream having a salinity above the threshold salinity for EOR, and introduced into one or more segments of the reservoir is utilized only when all other routes of disposal of PW are not sufficient for allocation of the entirety of the PW in line 72. Dynamic allocation at 1E may prioritize allocation of the produced water penultimately to (j), whereby overboarding to a maximum overboarding limit is utilized to dispose of PW only after all other disposal routes other than blending of the PW in (h) have been maximized. Thus, overboarding in (j) may be utilized only when needed to prevent dumping of the PW to the low salinity or softened water header that would result in a low salinity or softened water EOR stream having a salinity above the threshold salinity for EOR, thus potentially resulting in loss of EOR.

In embodiments, the EOR is effected via injection of a slug of low salinity or softened water, rather than continuous injection thereof. For example, in embodiments, the slug of low salinity or softened water EOR has a pore volume of less than or equal to about 0.9, 0.8, 0.7, 0.6, 0.5, 0.4, or 0.3. The measurement data received at 1A may include a compositional envelope for EOR. The low salinity or softened water EOR stream may have a composition as described, for example, in International Patent Application No. PCT/GB2007/003337 published as WO/2008/029124 or International Patent Application No. PCT/US2009/001816 and published as WO/2009/123683, the disclosure of each of which is hereby incorporated herein for purposes not contrary to this disclosure. For example, the low salinity or softened water EOR stream (e.g., the blended PW and low salinity or softened water stream or, initially, the RO/NF stream) may have a total dissolved solids (TDS) in the range of from 200 to 10,000 ppm, the fraction of the total multivalent cation content to the total multivalent cation content of the connate water in reservoir 65 can be less than 1, or both. The system may comprise sensors, such as sensors S1, S2, S3, S4, S5, S6, S7 indicated in the embodiment of FIG. 3, configured to measure ion concentration, such as salinity, total concentration of dissolved ions, or concentrations of individual ions (Ci), flow rates, or a combination thereof in various streams, such as the nanofiltration permeate (S1), the RO permeate (S2), the RO/NF stream (S3), the low salinity or softened water blend stream 35B (S4), the low salinity or softened water blend stream 35C introduced into the low salinity or softened water header 40 (S5), the treated PW stream (S6), or the disposal water stream to be introduced into disposal header 55 (S7). The ion concentration sensors, the flow rate sensors, and any other sensors described herein may communicate with a control unit (e.g., control unit 90) through any suitable communication technology, such as a direct electrical connection or wireless electrical connection (e.g., Wi-Fi, Bluetooth). Other sensors and locations are within the scope of this disclosure.

As described in Great Britain Patent Application No. GB 1714649.9, the various sensors (probes) may be included in the PW balance system of the present invention, in particular, in the blending system. These sensors may be used to determine the TDS and/or ionic composition of the blended low salinity injection water stream(s), for example, streams 35A, 35B, and/or 35C. For example, the TDS of the blended low salinity injection water stream(s) may be determined from the conductivity thereof, while the concentrations of individual ions or types of individual ions may be determined using glass probes having membranes that are permeable to specific individual ions or types of individual ions. Similarly, probes (sensors) may be present on one or more RO permeate lines 32/32A/32B/32C, one or more NF permeate lines 33/33A/33B/33C, any combined RO/NF permeate lines 35, or a combination thereof to obtain data relating to the TDS and ionic composition of the RO permeate stream(s), NF permeate stream(s), any combined RO/NF permeate stream(s) 35, or a combination thereof. Flow rate sensors may also be provided on flow lines for determining the flow rates of the various blending streams (RO permeate stream(s), NF permeate stream(s), any combined RO/NF permeate stream(s), PW blend line 84, PW dump line 85, etc.) and for determining the flow rates of RO permeate in an RO dump line and NF permeate in an NF dump line, or in a combined RO/NF dump line 36.

The target salinity for the EOR slug (comprising the blended low salinity or softened water and the PW stream 35C, or (initially) the RO/NF stream 35) is the salinity that has been estimated to provide the best EOR. In embodiments, the target salinity or TDS for the low salinity or softened water utilized for EOR is less than or equal to about 3000, 2000, or 1500 ppm. The threshold salinity or TDS is a salinity or TDS higher than the target salinity or TDS, but the maximum salinity or TDS at which EOR effect of low salinity or softened water is still expected to occur. In embodiments, the threshold salinity or TDS is less than or equal to about 10,000, 9,000, or 8000 ppm. In embodiments, the RO water in line 32 has a salinity or TDS of less than or equal to about 300, 250, or 200 ppm, and the PW (and/or NF permeate) is blended with the RO water via blend line 84 (and/or NF line 33) to provide a blended water having the target salinity or TDS and reinjected into reservoir 65 as low salinity or softened water EOR slug, and the remainder of the PWRI in line 83 to be reinjected is disposed of via injection into one or more segments of reservoir 65 allocated for disposal. In embodiments, the NF permeate in line 33 has a salinity or TDS in the range of from about 40,000 to 60,000, from about 45,000 to about 55,000, or from about 47,500 to about 52,500, or equal to about 40,000, 45,000 or 50,000 ppm. During commissioning of an injection well, the salinity may be controlled as described in Great Britain Patent Application No. GB 1712847.1, entitled "Method of Controlling Salinity During Commissioning of a Low Salinity Injection Well", the disclosure of which is hereby incorporated herein by reference for purposes not contrary to this disclosure.

In embodiments, dynamic allocation at 1E further comprises that if the total amount of PW for allocation is such that an amount of PW in (h) [e.g., an amount of PW blended with a stream of the low salinity or softened water to provide a low salinity or softened water EOR stream having a salinity above the threshold salinity for EOR, and introduced into one or more segments of the reservoir] would not be zero, one or more of the segments of the reservoir 65 allocated for low salinity or softened water EOR injection are converted to allocation for disposal, such that an amount of PW in (f) [e.g., an amount of PW injected via a disposal stream into one or more segments of the reservoir allocated for PW disposal] can be increased and an amount of PW in (h) remain zero, whereby a remainder of the one or segments of the reservoir allocated for low salinity or softened water EOR can still be supplied low salinity or softened EOR water having a salinity below the target or threshold salinity for low salinity or softened water EOR via (c) [e.g., an amount of PW blended with a stream of the low salinity or softened water to provide a low salinity or softened water EOR stream having a TDS content and ionic composition within a target compositional envelope for EOR and introduced as a slug of low salinity or softened water EOR into one or more segments of the reservoir allocated for secondary or tertiary low salinity or softened water EOR] or (g) [e.g., an amount of PW blended with a stream of the low salinity or softened water to provide a low salinity or softened water EOR stream having a TDS and ionic composition within a threshold compositional envelope for EOR, and introduced as a slug of low salinity or softened water EOR into one or more segments of the reservoir allocated for secondary or tertiary low salinity or softened water EOR]. In this manner, reassignment of one or more segments of reservoir 65 from EOR to disposal enables disposal of the excess PW into the newly assigned disposal segment(s) while maintaining the blended low salinity or softened water EOR stream at a salinity suitable for EOR (e.g., at a salinity less than or equal to the target salinity, or at least less than or equal to the threshold salinity above which EOR is not effective). Dynamic allocation of the routes for PW disposal and corresponding assignment of segment(s) of reservoir 65 as disposal or EOR segment(s) as per this disclosure may thus enable complete disposal of the PW, while maintaining as much EOR as possible.

In embodiments, the amount of PW reinjected into the reservoir comprises (c) (the amount of PW blended with a stream of the low salinity or softened water to provide a low salinity or softened water EOR stream having a salinity less than a target salinity for EOR and introduced as a slug of low salinity or softened water EOR into one or more segments of the reservoir allocated for secondary or tertiary low salinity or softened water EOR), (f) (the amount of PW injected via a disposal stream into one or more segments of the reservoir allocated for PW disposal), (g) (the amount of PW blended with a stream of the low salinity or softened water to provide a low salinity or softened water EOR stream having a salinity less than a threshold salinity for EOR, and introduced as a slug of low salinity or softened water EOR into one or more segments of the reservoir allocated for secondary or tertiary low salinity or softened water EOR), and (h) (the amount of PW blended with a stream of the low salinity or softened water to provide a low salinity or softened water EOR stream having a salinity above the threshold salinity for EOR, and introduced into one or more segments of the reservoir), and the water allocation prioritizes allocation of water in the order (i) (the amount of PW exported in the produced oil), (c), (f), (g), (j) (the amount of PW overboarded), (h).

In embodiments, the amounts of PW reinjected via (c) [e.g., an amount of PW blended with a stream of the low salinity or softened water to provide a low salinity or softened water EOR stream having a total dissolved solids (TDS) content and ionic composition within a target compositional envelope for EOR and introduced as a slug of low salinity or softened water EOR into one or more segments of the reservoir allocated for secondary or tertiary low salinity or softened water EOR], (d) [e.g., an amount of PW utilized as a drive and/or pre-flush fluid that is injected into one or more segments of the reservoir allocated for low salinity or softened water EOR subsequent and/or prior to, respectively, the injection of a slug of low salinity or softened water EOR thereto], (e) [e.g., an amount of PW utilized in secondary recovery mode via injection into one or more segments of the reservoir allocated for tertiary low salinity or softened water EOR prior to injection of a slug of low salinity or softened water EOR thereto in tertiary recovery mode], (g) [e.g., an amount of PW blended with a stream of the low salinity or softened water to provide a low salinity or softened water EOR stream having a TDS and ionic composition within a threshold compositional envelope for EOR, and introduced as a slug of low salinity or softened water EOR into one or more segments of the reservoir allocated for secondary or tertiary low salinity or softened water EOR]; and (h) [e.g., an amount of PW blended with a stream of the low salinity or softened water to provide a low salinity or softened water EOR stream having a salinity above the threshold salinity for EOR, and introduced into one or more segments of the reservoir] are injected into the associated one or more segments of the reservoir 65 via a low salinity or softened water EOR manifold 40, a plurality of injection pumps 60, and a low salinity or softened water EOR header 45, and the amount of PW reinjected via (f) for disposal is injected into the one or more segments of the reservoir 65 allocated for disposal via a disposal manifold 55, the plurality of injection pumps 60 and a disposal header 55. The plurality of injection pumps 60 can be fluidly connected with the low salinity or softened water EOR manifold 40 and the disposal manifold 50, and fluidly connected with the low salinity or softened water header 45 and with the disposal header 55.

Dynamically allocating at 1E can further comprise taking into account a number of segments of the reservoir 65 available for disposal, a number of segments of the reservoir 65 available for low salinity or softened water EOR, injection requirements, including target and threshold salinities, flow rates, and pore volumes for the low salinity or softened water EOR injected into low salinity or softened water EOR segments, an injection pump capacity for the disposal manifold 50, an injection pump capacity for the low salinity or softened water EOR manifold 40, a capacity of the low salinity or softened water header 45, a capacity of the disposal header 55, or a combination thereof.

In embodiments, dynamically allocating at 1E further comprises that if allocating as per a prioritization order of (i), (c), (g), (j), (h) would exceed the injection pump capacity for the low salinity or softened water manifold 40, injection of low salinity or softened water therefrom would be reduced, if allocating as per a prioritization order of (i), (c), (g), (j), (h) would exceed the injection pump capacity for the disposal manifold 50, injection of disposal water therefrom would be reduced, or a combination thereof.

In embodiments, dynamically allocating at 1E further comprises that if allocating as per the prioritization order of (i), (c), (g), (j), (h) would exceed the capacity of the low salinity or softened water EOR header 45 without exceeding the capacity of a first subset of the injection pumps 60 pumping water thereto, one or more segments of the reservoir 65 are switched to the low salinity or softened water EOR header 45, whereby the one or more segments are switched from allocation for disposal to allocation for low salinity or softened water EOR to provide additional injection capacity; if allocating as per the prioritization order of (i), (c), (g), (j), (h) would exceed the capacity of the disposal header 55 without exceeding the capacity of a remainder of the injection pumps 60 pumping water thereto, one or more segments of the reservoir 65 are switched to the disposal header 55 from the low salinity or softened water EOR header 45, whereby the one or more segments are switched from allocation for low salinity or softened water EOR to allocation for disposal to provide additional injection capacity; or a combination thereof.

Figure 4:
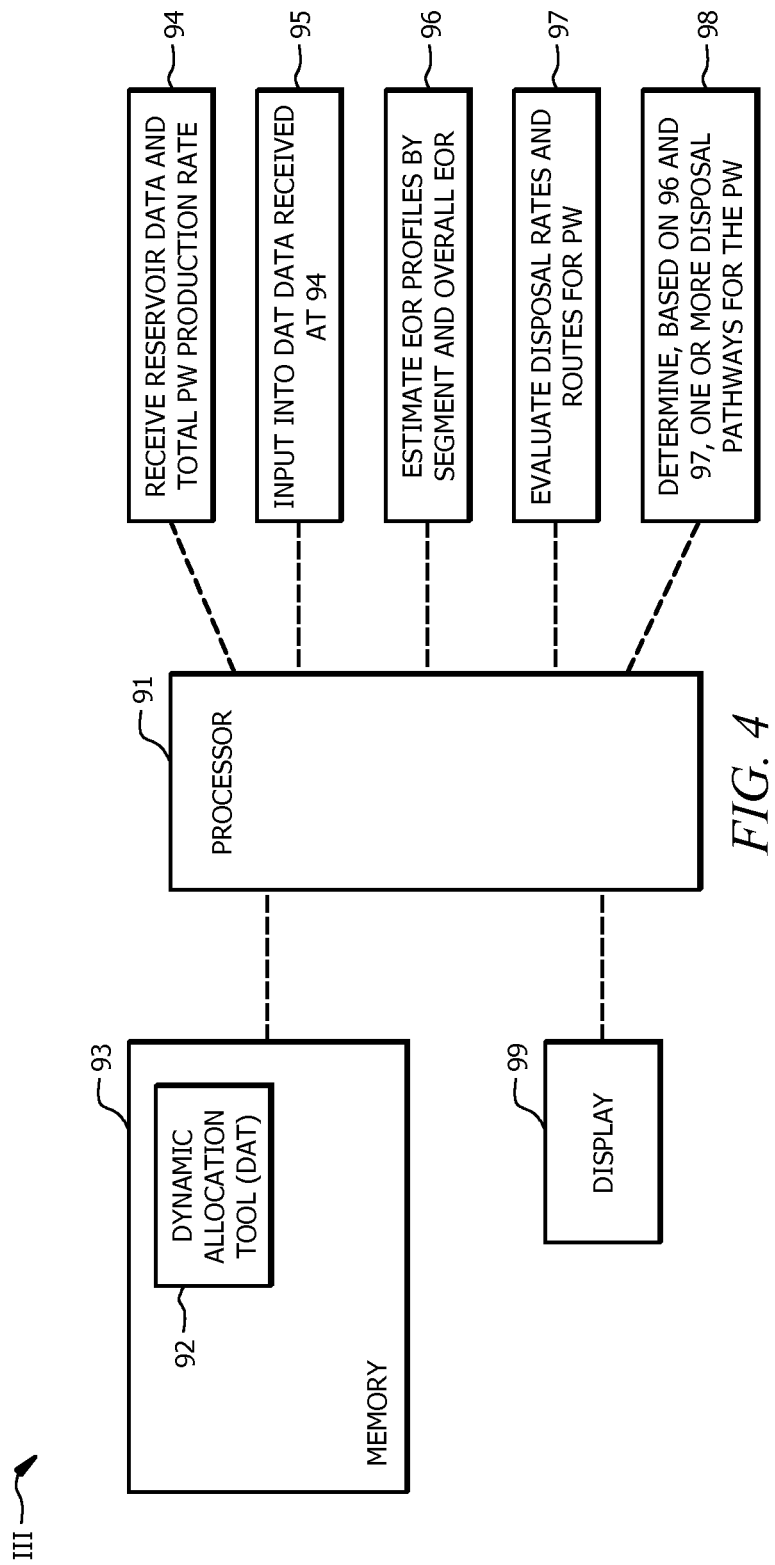
FIG. 4 is a schematic of a system III for dynamically allocating PW for disposal in a reservoir during a low salinity waterflood, according to an embodiment of this disclosure.

Also disclosed herein is a system for dynamically allocating produced water (PW) for disposal in a reservoir during a low salinity waterflood. (Although described hereinbelow with reference to a low salinity waterflood and low salinity water, the system is also applicable with a softened water waterflood and softened water.) The system is depicted in FIG. 4, which is a schematic of a system III for dynamically allocating PW for disposal in a reservoir during a low salinity waterflood. System III comprises: a memory 93 storing a dynamic allocation tool (DAT) 92; and a processor 91 in signal communication with memory 93. The dynamic allocation tool 92, when executed on processor 93, configures processor 93 to: receive reservoir data comprising a definition of an allocation of one or more segments of a reservoir as disposal segments and one or more segments of the reservoir as EOR waterflood segments, and total production rates of PW, as indicated at 94; input, into the dynamic allocation tool 92, data comprising the allocation of the one or more segments of the reservoir and the total production rates of PW, as indicated at 95; estimate low salinity EOR profiles by segment for each of the one or more segments and an overall enhanced oil recovery, as indicated at 96; evaluate various reinjection and non-reinjection PW disposal routes and rates for the PW, as indicated at 97; and determine, on the basis of the estimation at 96 and the evaluation at 97, one or more disposal pathways for the PW, as indicated at 98. As discussed hereinabove with reference to FIGS. 1-3, the one or more disposal pathways can comprise: one or more reinjection disposal pathways selected from (a) blending with a low salinity stream produced via a low salinity apparatus to provide a low salinity EOR water for injection into one or more of the low salinity EOR segments; (b) reinjection via a disposal water into one or more of the disposal segments; or a combination thereof, and/or one or more non-reinjection disposal pathways comprising (c) export in a produced oil; (d) discharge, or a combination thereof, wherein the rates of disposal of PW via (a), (b), (c), (d), or a combination thereof equals the total production rate of PW.

With reference back to FIGS. 2 and 3, in embodiments, the data received at step 94 and/or inputted at step 95 can further include a low salinity or softened water stream capacity provided by the low salinity apparatus 30, a number of injection pumps 60 available to inject low salinity EOR water from a low salinity EOR manifold 40 or disposal water from a disposal manifold 50 into a low salinity EOR header 45, a number of injection pumps 60 available to inject low salinity water from a low salinity EOR manifold 40 or disposal water from a disposal manifold 50 into a disposal header 55, a maximum capacity of each pump 60, a minimum turndown rate of each pump 60, a target low salinity EOR injection salinity or TDS (e.g., a target compositional envelope), a maximum acceptable or 'threshold' salinity or TDS for low salinity EOR (e.g., a threshold compositional envelope), a produced water profile delay due to low salinity EOR (e.g., a predicted delay in the production of PW due to EOR), a low salinity EOR slug size as a fraction of pore volume (PV) for each of the low salinity EOR segments, a PV of each segment, a start date for injection of PW or low salinity EOR water for each segment, a start date for injection of low salinity EOR water for each EOR segment, or a combination thereof. The processor 91 may also provide an output, for example via display 99, indicating the performance of low salinity or softened water production apparatus 30, injection header rates and salinities for low salinity or softened water injection header 45 and disposal header 55, utilization of each injection pump 60 and low salinity apparatus 30 (e.g., RO bank utilization), injection rates by segment, or a combination thereof.

The processor 91 may be operable to identify (and provide an output regarding) pump utilization regimes for the various evaluated reinjection routes. The processor may comprise three pump utilization regimes, including a first or 'good' regime indicating that each of the injection pumps 60 is dedicated to one of the low salinity EOR header 45 or the disposal header 55; a second or 'OK' regime indicating that an injection pump 60 is being assigned to inject low salinity EOR from low salinity manifold 40 into both the low salinity EOR header 45 and the disposal header 55; and a third or 'Fail' regime indicating that an injection pump 60 is assigned to inject the low salinity EOR water from low salinity manifold 40 into the low salinity EOR header 45 and disposal water from disposal manifold 50 into the disposal header 55. Should any third of "Fail" regimes be identified, processor 91 and/or a user may re-evaluate the rates and disposal routes for the PW at 97 and/or determine alternate disposal pathways for the PW at 98 by increasing or decreasing injection to one or more segments to obtain a first or second regime for each of the injection pumps 60.

In embodiments, if processor 91 determines at 98 that excess low salinity EOR water is being sent to the disposal header 55 (e.g., via low salinity or softened water makeup line 37), one or more additional segments of the reservoir 65 can be allocated (e.g., from disposal segment(s)) as low salinity EOR segments as such excess low salinity EOR water becomes available, and such reallocation input into DAT 92 at 95.

The DAT 92 may also require processor 91 to meet the following conditions, in addition to maintaining that the sum of the rates of disposal of PW in (a), (b), (c), and (d) equal the total production rate of PW: a total water injection rate into the one or more EOR segments of (a) and the one or more disposal segments of (b) is greater than or equal to an assumed PW re-injection rate equal to the projected total production rate of PW minus the rates of disposal of PW via (c) and (d); the low salinity EOR stream (e.g., stream 35C) has a total salinity equal to a target salinity; a salinity in the low salinity EOR header 45 is less than a threshold salinity for EOR; the low salinity water production apparatus 30 has a low salinity stream capacity sufficient to provide the low salinity stream; the number of required injection pumps 60 does not exceed the total number of available injection pumps 60; each of the injection pumps 60 is operated above a minimum injection pump turndown rate; rates and salinities are greater than or equal to zero, or a combination thereof.

The processor 91 may be configured to distribute the low salinity stream (e.g., in low salinity line 35) and the PW (e.g., in PW line 83) between a low salinity EOR header 45 and a disposal header 55, wherein PW reinjected via (a) or (b) is primarily sent to a disposal header 55 for disposal as per (b), and the low salinity produced in the low salinity apparatus 30 is preferentially sent to a low salinity header 45 for blending as a low salinity EOR stream as in (a).

In embodiments, the low salinity production apparatus 30 comprises one or more reverse osmosis (RO) units 31 (e.g., RO units or groups 31A/31B/31C of the embodiment o FIG. 3), and the processor 91 may be further configured to take into account a capacity of an RO unit 31 to produce RO water, and a number of available RO units 31. The DAT 92 may instruct the processor 91 to preferentially allocate the RO water in line(s) 32 for disposal via blending with PW, as in (a), blending with nanofiltration (NF) water should PW not be available, such as during initial stages of EOR, or both.

Figure 2:
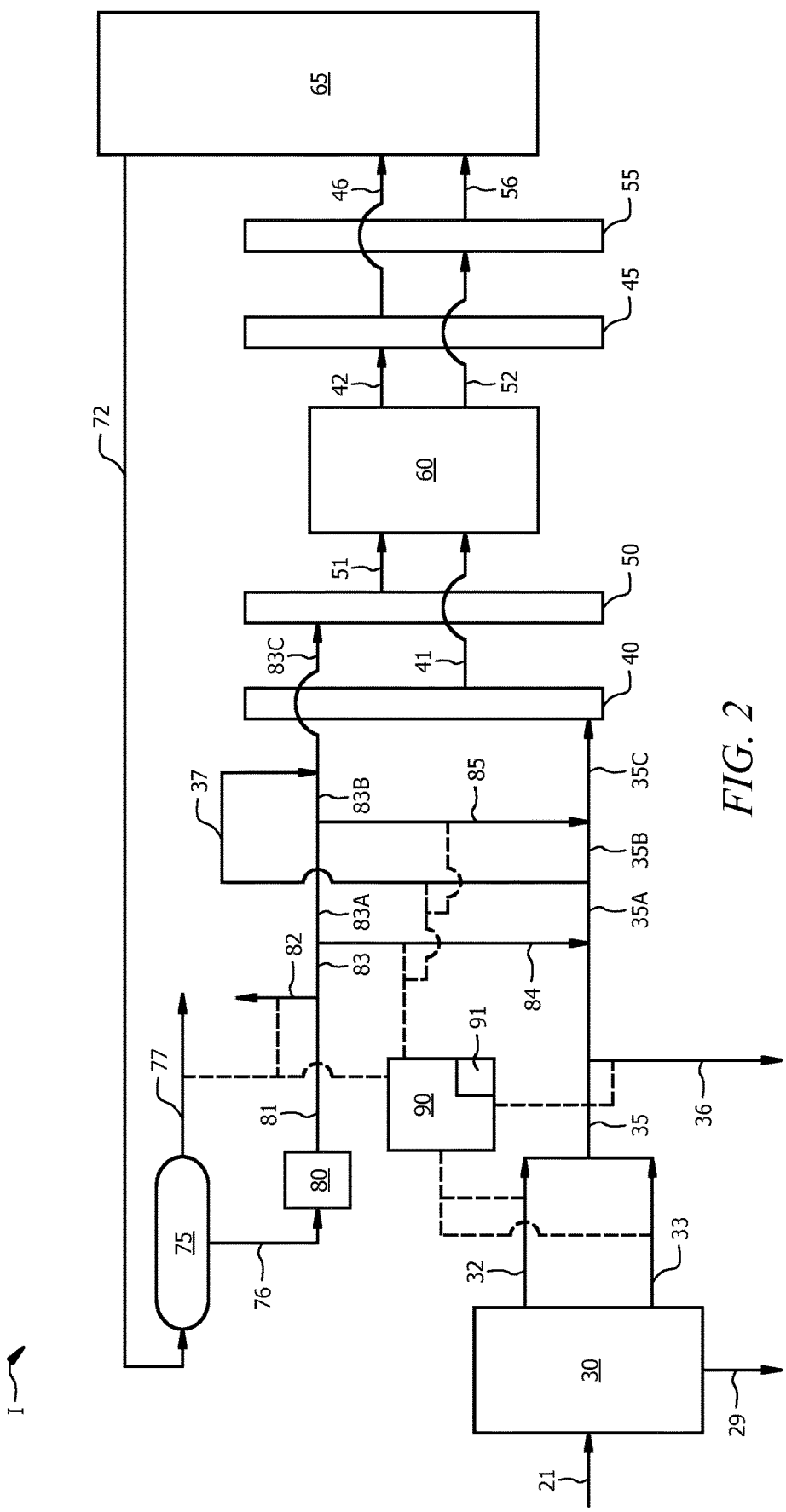
FIG. 2 is a schematic of a facilities configuration I for which the herein-disclosed PW balance tool can be utilized to allocate PW disposal, according to an embodiment of this disclosure.

In embodiments, system III can be utilized for the design of a facility such as facility I of FIG. 2 or facility II of FIG. 3 for low salinity EOR (for example, capacity of low salinity or softened water production apparatus 30, size and number of pumps 60, etc.) or for the analysis and/or reallocation of segments of reservoir 65, PW disposal routes, or both within an existing low salinity EOR facility. In embodiments, the processor 91 calculates or receives measurement data at 94 of a salinity of the low salinity EOR water for injection as per (a) and a salinity of the disposal water, and one or more of the segments allocated for low salinity EOR injection are re-allocated for disposal if the evaluation at 97 indicates that the blended water in (a) has a salinity above a target salinity, or above a threshold EOR salinity.

As described with reference again to FIGS. 2 and 3, also disclosed herein is a system for simultaneously injecting a low salinity waterflood and produced water for disposal into a reservoir 65 comprising a plurality of segments (e.g., segments 65A-65I of the embodiment of FIG. 3), the system comprising: a low salinity water production system 30 configured to produce a low salinity water stream; a separation system 75 configured to separate product oil for export via oil export line 77 from a production well product (e.g., in line 72) comprising oil, PW, and gas and thus provide a PW in line 76 for disposal; a low salinity injection manifold 40 fluidly connected via a low salinity line 35 with the low salinity water production system 30; a disposal injection manifold 50 fluidly connected via a disposal line 83 with the separation system 75; one or more injection pumps 60 fluidly connected with the low salinity injection manifold 40 and the disposal injection manifold 50; a low salinity injection header 45 fluidly connected with the one or more injection pumps 60, whereby a low salinity EOR stream comprising at least a portion of the low salinity water stream can be injected into one or more segments of the reservoir 65 allocated for low salinity EOR; a disposal injection header 55 fluidly connected with the one or more injection pumps 60, whereby a disposal stream comprising at least a portion of the PW for disposal can be injected into one or more segments of the reservoir 65 allocated for disposal; a blend line 84 fluidly connecting the disposal line 83 with the low salinity line 35, whereby a portion of the PW for disposal can be blended with the low salinity water stream to provide the low salinity EOR stream prior to introduction into the low salinity manifold 40; and a control unit or system 90 comprising a processor 91.

Control unit 90 can include a CPU (central processing unit) 91, a memory 93 (e.g., a RAM (random access memory), a ROM (read only memory)), a HDD (hard disk drive), I/F (interfaces), display 99, and the like, and may be implemented by executing a software including a dynamic allocation tool (DAT) stored in the memory (e.g., ROM) by the CPU 91. The DAT 92 can configure the processor 91 (when executed upon the processor) to perform any of the steps and methods described herein. The processor 91 thus comprises software configured to: determine injection rates per segment that meet voidage requirements and EOR injection while dynamically allocating the total PW for disposal via one or more reinjection pathways, one or more non-reinjection pathways, or a combination thereof, wherein the one or more reinjection pathways are selected from introduction into the disposal injection header 55 via the disposal line 83, introduction into the low salinity header 45 via the blend line 84, or a combination thereof. As indicated by dotted lines in FIG. 2, control unit 90 may be operable to adjust (via valves not shown in FIG. 2) the flow rate in one or more of line 32 (RO permeate line), line 33 (NF permeate line), line 97 (PW export with oil), 82 (PW overboarding), 84 (PW blending with low salinity or softened water to target or at least threshold salinity), 35 (RO/NF water), dump line(s) 36, 37 (amount of low salinity water make-up to disposal line), 85 (dump of PW to low salinity or softened water header above threshold salinity).

Typically, the boundary values (or composition envelope) for the TDS of the blended low salinity EOR injection water stream(s) may be in the range of 200 to 10,000 mg/L, preferably 500 to 10,000 mg/L. Generally, lower TDS ranges provide higher EOR while higher TDS ranges mitigate the risk of formation damage, especially in reservoirs comprising rocks with high levels of swellable and/or migratable clays. Alternative boundary values for the TDS may be, for example, in the range of 500 to 5,000 mg/L, 500 to 3,000 mg/L, 1,000 to 2,000 mg/L, 2000 to 5000 mg/L, or 3000 to 7000 mg/L (depending on the risk of formation damage). The or another control unit 90 may control the compositions of the low salinity or softened injection waters for the EOR segments of the reservoir to within a selected range for the boundary values for the TDS.

Where there is a souring risk or scaling risk for the reservoir 65, the control unit 90 can control the sulfate anion concentration of the blended low salinity or softened EOR injection waters for the segments of the reservoir to a value of less than 100 mg/L, 50 mg/L, or 40 mg/L.

The control unit 90 may be operable to control the total multivalent cation concentration of the blended low salinity or softened EOR injection waters for the EOR segments of the reservoir, for example to within the range of 1 to 250 mg/L, 3 to 150 mg/L, or 50 to 150 mg/L, with the proviso that the ratio of the multivalent cation content of the blended low salinity injection water(s) to the multivalent cation content of the connate water contained in the pore space of the reservoir rock for each segment or region of the reservoir 65 is less than 1. The control unit may be operable to control the calcium cation concentration of the blended EOR injection waters for the EOR segments of reservoir 65 to within the range of 1 to 200 mg/L, 5 to 150 mg/L, or 50 to 150 mg/L, with the proviso that the ratio of the calcium cation content of the blended low salinity injection water(s) to the calcium cation content of the connate water contained in the pore space of the reservoir rock of each segment or region of reservoir 65 is less than 1.

Control unit 90 may be operable to control the magnesium cation concentration of the blended EOR injection waters for the EOR segments of reservoir 65 to within the range of 2 to 400 mg/L, 10 to 300 mg/L, or 100 to 300 mg/L, with the proviso that the magnesium cation content of the blended low salinity EOR injection water(s) to the magnesium cation content of the connate water contained in the pore space of each segment or region of reservoir 65 is less than 1.

Control unit 90 may be operable to control the potassium cation concentration of the blended EOR injection waters for the segments of the reservoir 65 to within the range of 10 to 2000 mg/L, in particular, 250 to 1000 mg/L, with the proviso that the TDS of the blended low salinity EOR injection water(s) remains within the boundary values for the predefined operating envelope.

Control unit 90 may be operable to control the composition of the blended low salinity EOR injection water within a selected range defined by boundary values for the TDS (and within selected ranges defined by boundary values for multivalent cation content, calcium cation content, magnesium cation content and/or potassium cations content) for a region of overlap of the boundary values for the TDS (and for a region of overlap of the boundary values for multivalent cation content, calcium cation content, magnesium cation content and potassium cations content) for one or more segments or regions of reservoir 65.

The boundary values for the TDS and concentrations of individual ions and the concentration of any clay stabilizing additive for the low salinity EOR injection water may vary depending on the low salinity EOR response for each segment of the reservoir 65 and the composition of the rock of the oil-bearing layer(s) of each segment of the reservoir 65, and in particular, on the levels of swellable and migratable clays and minerals that are known to be linked to formation damage.

The control unit of the desalination or water softening plant 30 may change the operation of the desalination or water softening plant 30, in real time, to adjust the amounts of RO permeate, NF permeate, and PW blending streams that are to be blended thereby maintaining the composition(s) of the blended low salinity or softened water EOR streams within predetermined operating envelope(s) that have been inputted into the control unit. The control unit 90 may automatically adjust the blending, and, hence, the amounts of the RO permeate stream (e.g., in line(s) 32), NF permeate stream (e.g., in line(s) 33), the PW stream for blending in line 84 (and of any optional SW or optional clay stabilizer concentrate stream), or combination thereof that are included in the blended low salinity or softened EOR injection water stream(s) (e.g., to form low salinity or softened EOR water stream 35C) in response to changes in injectivity in one or more of the segments of the reservoir 65.

The boundary values or compositional envelopes for the EOR segment(s) may have been determined by analysing samples of reservoir rock taken from each region of the oil-bearing layer of the reservoir 65. The samples of the reservoir rock may be rock cuttings, or a side wall core. Alternatively, the reservoir rock surrounding an injection wellbore may be analysed by geophysical logging using a downhole logging apparatus. Analysis of the rock for each region of the oil-bearing layer of the reservoir 65 may include, but is not limited to determining the whole rock clay content for reservoir rock surrounding the injection wellbore(s) in the various segments or regions of the reservoir. The whole rock clay content of the reservoir rock for the segments or regions of the reservoir may be determined by geophysical logging, X-ray diffraction (XRD), scanning electron microscopy (SEM), infrared scintillation point counting or sieve analysis. The whole rock clay content of the reservoir rock may be in the range from about 2 weight percent (wt %) to about 20 wt %. Analysis of the rock for each region of the oil-bearing layer of the reservoir may also include determining the mineral content of the clay fraction of the rock, in particular, clays of the smectite type (such as montmorillonite), pyrophyllite type, kaolinite type, illite type, chlorite type and glauconite type, which can be determined by X-ray diffraction (XRD) or scanning electron microscopy (SEM) analysis. The optimal salinities (and compositions) for the blended low salinity EOR injection waters for each segment or region of the reservoir 65 may be determined from correlations of formation damage occurring with different salinity boundary values (and different concentrations of individual ions or types of individual ions) for the injection water for a range of rock samples with different clay contents and clay compositions and selecting boundary values for the salinity (or composition) of the blended low salinity injection water for a rock sample that most closely matches the composition of the rock (e.g. using historical data) for each region of the reservoir 65 that is to be subjected to the low salinity EOR waterflood. Alternatively, experiments may be performed on samples of the rock taken from the regions of the reservoir where the injection wells 47 have been drilled using different boundary values for the salinity and composition (concentrations of individual ions or types of individual ions) for the blended low salinity injection water to determine an optimal envelope for the salinity and composition for the injection waters to be injected into each segment or region of the reservoir 65 during the low salinity EOR waterflood.

Typically, the injection capacity for the blended low salinity injection water(s) is limited owing to the limited capacity of the desalination or water softening plant 30. Accordingly, the low salinity EOR waterflood may be designed to inject a low pore volume (PV) slug of the blended low salinity injection water into the injection well(s) 47 penetrating the oil-bearing layer of each region of the reservoir 65 in an amount of at least 0.3 pore volumes, preferably, at least 0.4 pore volumes as slugs having these minimum pore volumes tend to maintain their integrity within the formation. In order to limit the amount of water injected into each region of the reservoir from the injection well(s) 47, the pore volume of the blended low salinity EOR injection water can be less than 1 PV, less than or equal to 0.9 PV, less than or equal to 0.7 PV, less than or equal to 0.6 PV, or less than or equal to 0.5 PV, in embodiments.

After injection of the low pore volume of the blended low salinity or softened EOR injection water into the injection well(s) 47 penetrating a segment(s) of the reservoir 65, a drive water may be injected from the injection well(s) 47 into the region of the oil-bearing layer of the reservoir to ensure that the slug of blended low salinity injection water (and hence the bank of released oil) is swept through the oil-bearing layer of the reservoir 65 to a production well 71 that penetrates the region of the oil bearing layer of the reservoir 65. In addition, the injection of the drive water may be utilized to maintain the pressure in the segment(s) or region(s) of the reservoir 65. Typically, the drive water has a greater PV than the slug of aqueous displacement fluid (e.g., the low salinity or softened EOR injection water).

As noted herein, the drive water can be produced water or a mixture of seawater and produced water, depending on the amount of produced water separated from the produced fluids at production facility or separator 75. The use/disposal of produced water as a drive water can be advantageous owing to the restrictions on disposal of produced water into the ocean. Accordingly, following injection of the slug of low salinity injection water into the injection well(s) 47 penetrating a region of the reservoir 65, the injection well(s) 47 may be used as produced water disposal well(s).

The flow rate and composition of the blended low salinity or softened water EOR injection stream may be monitored in real time to determine whether changes made by the control unit 90 to the blending to maintain the composition of the blended low salinity or softened EOR injection water within the operating envelope are effective. If not, the control unit may make further changes to the blending. Accordingly, the control unit 90 may have a feedback loop for controlling blending of (e.g., the RO water, NF water, PW water, SW, or combination thereof to produce) the blended low salinity or softened water EOR stream(s) 35C.

The one or more reinjection and non-reinjection pathways for disposal of the PW and components of the system at step 98 of the embodiment of FIG. 4 may be as noted hereinabove with reference to FIGS. 1-3. In embodiments, the software 92 further enables dynamic allocation of the one or more injection pumps 60 from the low salinity header 45 to the disposal header 55, whereby an injection capacity of the low salinity header 45 and an injection capacity of the disposal header 55 can be met. In embodiments, the software takes as inputs the total PW production rate, and, should allocation of the total PW for disposal via export with the produced oil, overboarding, introduction into the disposal injection header 55 via the disposal line, and introduction into the low salinity injection header 45 via the blend line result in a blended low salinity EOR stream 35C having a salinity above a threshold salinity for EOR, allocates one or more segments of the reservoir 65 previously allocated for low salinity EOR as a disposal segment, such that the blended low salinity EOR stream 35C in the low salinity line maintains a salinity below the threshold salinity or equal to a target salinity, whereby low salinity EOR can be continued in the remaining segments of reservoir 65 allocated as low salinity segments.

Owing to the risk of formation damage during a low salinity or softened water EOR water flood, a maximum permitted increase in downhole pressure for the injection well(s) 47/57 penetrating the segments of the reservoir 65 may be inputted into the control unit 90. Both an increase in downhole pressure in an injection well 47/57 penetrating one of the regions of the reservoir 65 and a decrease in flow rate downstream of the injection pump(s) 60 are indicative of loss of injectivity arising from formation damage in one of the segments of the reservoir 65.

The downhole pressure in the injection well(s) 47 adjacent the oil-bearing layer in each segment of the reservoir 65 (or the flow rate of the blended low salinity or softened EOR injection water downstream of the injection pump(s) of the injection system 60) may be monitored in real time. The pressure in the injection well(s) 47 may be monitored with a downhole measurement device such as a pressure sensor that is linked to the control unit 90, for example, via a fibre optic telemetry line or any other suitable communication technology.

If the control unit 90 determines there is a decline in injectivity for the injection well(s) 47 penetrating one or more of the regions of the reservoir 65, the control unit may select a different operating envelope for the composition of the blended EOR injection water stream(s) that is predicted to have a lower risk of causing formation damage (while maintaining an acceptable level of EOR from the region(s) of the reservoir) and may then adjust the blending ratios of the various blending streams (e.g., low salinity or softened water, such as RO permeate and/or NF permeate in lines 32 and 33, respectively, PW blend water in blend line 84) such that the composition of the blended low salinity EOR injection water injected into the injection well(s) 47 penetrating the EOR segment(s) of the reservoir 65 falls within the operating envelope(s). The control unit can continue to monitor the downhole pressure in the injection well(s) 47 penetrating the region(s) of the reservoir 65 where there has been a decline in injectivity (or the flow rate downstream of the injection pump(s) 60 for the dedicated injection lines leading to the injection well(s) 47 penetrating the region(s) of the reservoir 65 where there has been a decline in injectivity) in real time to determine if the pressure (or flow rate) begins to stabilize in response to injection of a blended low salinity EOR injection water having a composition within the preferred operating envelope. If not, the control unit 90 may make further changes to the blending to adjust the composition of the blended low salinity or softened EOR injection water stream(s) to fall within another operating envelope that is predicted to have a lower risk of causing formation damage. This process is iterative and may be repeated many times. Optionally, the control unit may take a decision to reduce the flow rate of low salinity or softened EOR injection water or stop injecting low salinity or softened EOR injection water into the injection well(s) 47 of one or more regions of the reservoir 65 if the pressure continues to rise. The control unit may take the decision to inject a clay stabilizing composition (e.g., the undiluted clay stabilizing concentrate) into the oil-bearing layer(s) of the region(s) of the reservoir 65, where there has been a decline of injectivity, for a period of several days before recommencing the low salinity or softened water EOR waterflood.

Injection of low salinity or softened water and PW are affected by placement of initial injection wells in the various segments of reservoir or field 65. Initially, there may be injection wells in the segment(s) assigned for secondary low salinity or softened water waterflood and dedicated PW disposal wells in the segment(s) assigned for continuous disposal of PW (without any tertiary low salinity or softened water waterflood). The various injection wells 47/57 for the different segments of the reservoir 65 are typically drilled in sequence from a platform over a prolonged period of time. Some segments are developed before other segments. Sufficient injection of water in each segment is utilized to support oil production from production wells 71 (e.g., for voidage replacement). Experience of operating the first few wells may provide information useful for assigning the various segments for secondary or tertiary EOR or for disposal, and for dynamically allocating the PW. For example, there may be unexpected pressure depletion profiles that can provide information on the connectivity of the injection and production wells and lead to modifications to the planned placement of wells. The herein-disclosed PW balance system, method, and tool enable dynamic allocation of the PW among reinjection and non-reinjection disposal routes over the lifetime of the EOR waterflood.

Introduction of low salinity or softened water into disposal header 55 by one of the injection pumps 60 is essentially wasted, and the herein-disclosed system, method, and tool for dynamic allocation of PW may enable avoidance of this situation by evaluating the use of additional injection wells and segments of reservoir 65 for low salinity or softened water EOR injection once excess low salinity or softened water becomes available (e.g., tertiary low salinity or softened water injection into an injection well or segment of reservoir 65 that previously received PW). If the capacity of the PW disposal header 55 will be exceeded without introduction of PW into the low salinity or softened water header 55 at a level exceeding the threshold compositional envelope, alternative simulation scenarios which do not result in loss of low salinity or softened water EOR in all the segments allocated for EOR can be evaluated via the herein disclosed system, method, and tool. For example, the system, method, and tool of this disclosure may provide for converting one or more segments or wells of the reservoir previously allocated for EOR to a disposal segment or well, while maintaining EOR in the remaining segments allocated for EOR.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Embodiments disclosed herein include:

A: A method of dynamically allocating a total amount of Produced Water (PW) from a reservoir during enhanced oil recovery (EOR) via a low salinity or softened water EOR flood, the method comprising: receiving measurement data associated with a reservoir, a PW, and a low salinity or softened water, wherein the measurement data comprises: a PW production rate from the reservoir, a low salinity or softened water injection rate, an injection water compositional envelope, and a total water injection rate; receiving reservoir configuration information comprising: one or more EOR injection zones, an EOR injection rate associated with each of the one or more EOR injection zones, one or more disposal injection zones, a disposal zone injection rate associated with each of the one or more disposal injection zones, one or more non-reinjection disposal routes, and a non-reinjection disposal rate associated with each of the one or more non-reinjection disposal routes; determining a blending rate comprising at least a portion of the PW production rate and at least a portion of the low salinity or softened water injection rate to provide a blended injection fluid, wherein the blending rate maintains a composition of the blended injection fluid within the injection water compositional envelope; blending at least a portion of the PW with at least a portion of the low salinity or softened water at the blending rate; and dynamically allocating the PW production rate among: (a) reinjection into the reservoir via the blending with the low salinity or softened water and injection into the one or more EOR injection zones, injection into the one or more disposal injection zones, or a combination thereof; (b) disposal through one or more non-reinjection disposal routes, or a combination thereof, wherein the dynamic allocation maintains the EOR injection rate, the disposal zone injection rate, and the non-reinjection disposal rate below predetermined thresholds, results in reinjection or non-reinjection disposal of the entire PW production rate, and meets a total voidage replacement rate whereby the sum total of the amount of water reinjected in (a) equals a voidage requirement.

B: A system for dynamically allocating Produced Water (PW) for disposal in a reservoir during a low salinity waterflood, the system comprising: a memory storing a dynamic allocation tool; and a processor in signal communication with the memory, wherein the dynamic allocation tool, when executed on the processor, configures the processor to: receive reservoir data comprising a definition of an allocation of one or more segments of a reservoir as disposal segments and one or more segments of the reservoir as EOR waterflood segments, and total production rates of PW; input, into the dynamic allocation tool, data comprising the allocation of the one or more segments of the reservoir and the total production rates of PW; estimate low salinity enhanced oil recovery (EOR) profiles by segment for each of the one or more segments and an overall enhanced oil recovery; evaluate various reinjection and non-reinjection disposal routes and rates for the PW; and determine, on the basis of the estimation and the evaluation, one or more pathways for the PW, wherein the one or more pathways comprise: one or more reinjection disposal pathways selected from (a) blending with a low salinity stream produced via a low salinity apparatus to provide a low salinity EOR water for injection into one or more of the low salinity EOR segments; (b) reinjection via a disposal water into one or more of the disposal segments; or a combination thereof, and/or one or more non-reinjection pathways comprising (c) export in a produced oil; (d) discharge, or a combination thereof, wherein the rates of disposal of PW via (a), (b), (c), (d), or a combination thereof equals the total production rate of PW.

C: A system for simultaneously injecting a low salinity waterflood and produced water for disposal into a reservoir comprising a plurality of segments, the system comprising: a low salinity water production system configured to produce a low salinity water stream; a separation apparatus configured to separate a product oil for export from a field product comprising produced oil, a total PW for disposal, and gas; a low salinity injection manifold fluidly connected via a low salinity line with the low salinity water production system; a disposal injection manifold fluidly connected via a disposal line with the separation apparatus; one or more injection pumps fluidly connected with the low salinity injection manifold and the disposal injection manifold; a low salinity injection header fluidly connected with the one or more injection pumps, whereby a low salinity EOR stream comprising at least a portion of the low salinity water stream can be injected into one or more segments of the reservoir allocated for low salinity EOR; a disposal injection header fluidly connected with the one or more injection pumps, whereby a disposal stream comprising at least a portion of the total PW for disposal can be injected into one or more segments of the reservoir allocated for disposal; a blend line fluidly connecting the disposal line with the low salinity line, whereby a portion of the total PW for disposal can be blended with the low salinity water stream to provide the low salinity EOR stream prior to introduction into the low salinity manifold; and a control system comprising a processor with software configured to: determine injection rates per segment that meet voidage requirements and EOR injection while dynamically allocating the total PW for disposal via one or more reinjection pathways, one or more non-reinjection pathways, or a combination thereof, wherein the one or more reinjection pathways are selected from introduction into the disposal injection header via the disposal line, introduction into the low salinity header via the blend line, or a combination thereof.

Each of embodiments A, B and C may have one or more of the following additional elements:

Element 1: wherein an amount of PW reinjected into the reservoir in (a) is divided among one or more of: (c) an amount of PW blended with a stream of the low salinity or softened water to provide a low salinity or softened water EOR stream having a salinity less than a target salinity for EOR and introduced as a slug of low salinity or softened water EOR into one or more segments of the reservoir allocated for secondary or tertiary low salinity or softened water EOR; (d) an amount of PW utilized as a drive and/or pre-flush fluid that is injected into one or more segments of the reservoir allocated for low salinity or softened water EOR subsequent and/or prior to, respectively, the injection of a slug of low salinity or softened water EOR thereto; (e) an amount of PW utilized in secondary recovery mode via injection into one or more segments of the reservoir allocated for tertiary low salinity or softened water EOR prior to injection of a slug of low salinity or softened water EOR thereto in tertiary recovery mode; (f) an amount of PW injected via a disposal stream into one or more segments of the reservoir allocated for PW disposal; (g) an amount of PW blended with a stream of the low salinity or softened water to provide a low salinity or softened water EOR stream having a salinity less than a threshold salinity for EOR, and introduced as a slug of low salinity or softened water EOR into one or more segments of the reservoir allocated for secondary or tertiary low salinity or softened water EOR; and (h) an amount of PW blended with a stream of the low salinity or softened water to provide a low salinity or softened water EOR stream having a salinity above the threshold salinity for EOR, and introduced into one or more segments of the reservoir; wherein the amounts of PW allocated to each of (c), (d), (e), (f), (g), and (h) are maintained below injection limits for the associated one or more segments thereof. Element 2: wherein the slug of low salinity or softened water EOR has a pore volume of less than or equal to about 0.8, 0.7, 0.6, 0.5, 0.4, or 0.3. Element 3: wherein, if the total amount of PW for allocation is such that an amount of PW in (h) would not be zero, one or more of the segments of the reservoir allocated for low salinity or softened water EOR injection are converted to allocation for disposal, such that an amount of PW in (f) can be increased and an amount of PW in (h) remain zero, whereby a remainder of the one or segments of the reservoir allocated for low salinity or softened water EOR can still be supplied low salinity or softened EOR water having a salinity below the target or threshold salinity for low salinity or softened water EOR via (c) or (g). Element 4: wherein (b) disposal through one or more non-reinjection routes comprises (i) export in produced oil, (j) overboarding, or a combination thereof. Element 5: wherein the amount of PW present in the produced oil for export in (i) is maintained below a maximum export limit, and wherein the amount of PW overboarded in (j) is maintained below a maximum overboard limit. Element 6: wherein the allocating prioritizes allocation of PW firstly to (i), penultimately to (j), lastly to (h), or a combination thereof. Element 7: wherein (a) the amount of PW reinjected into the reservoir comprises (c), (f), (g), and (h), and wherein the water allocation prioritizes allocation of water in the order (i), (c), (f), (g), (j), (h). Element 8: wherein the amounts of PW reinjected via (c), (d), (e), (g), and (h) are injected into the associated one or more segments of the reservoir via a low salinity or softened water EOR manifold, a plurality of injection pumps, and a low salinity or softened water EOR header, and wherein the amount of PW reinjected via (f) for disposal is injected into the one or more segments of the reservoir allocated for disposal via a disposal manifold, the plurality of injection pumps and a disposal header. Element 9: wherein the plurality of injection pumps are fluidly connected with the low salinity or softened water EOR manifold and the disposal manifold, and fluidly connected with the low salinity or softened water header and with the disposal header. Element 10: wherein allocating further comprises taking into account a number of segments of the reservoir available for disposal, a number of segments of the reservoir available for low salinity or softened water EOR, injection requirements, including target and threshold salinities, flow rates, and pore volumes, for the low salinity or softened water EOR injected into low salinity or softened water EOR segments, an injection pump capacity for the disposal manifold, an injection pump capacity for the low salinity or softened water EOR manifold, a capacity of the low salinity or softened water header, a capacity of the disposal header, or a combination thereof. Element 11: wherein if allocating as per a prioritization order of (i), (c), (f), (g), (j), (h) would exceed the injection pump capacity for the low salinity or softened water manifold, injection of low salinity or softened water therefrom would be reduced, if allocating as per a prioritization order of (i), (c), (f), (g), (j), (h) would exceed the injection pump capacity for the disposal manifold, injection of disposal water therefrom would be reduced, or a combination thereof. Element 12: wherein if allocating as per the prioritization order of (i), (c), (f), (g), (j), (h) would exceed the capacity of the low salinity or softened water EOR header without exceeding the capacity of a first subset of the injection pumps pumping water thereto, one or more segments of the reservoir are switched to the low salinity or softened water EOR header, whereby the one or more segments are switched from allocation for disposal to allocation for low salinity or softened water EOR to provide additional injection capacity; if allocating as per the prioritization order of (i), (c), (f), (g), (j), (h) would exceed the capacity of the disposal header without exceeding the capacity of a remainder of the injection pumps pumping water thereto, one or more segments of the reservoir are switched to the disposal header from the low salinity or softened water EOR header, whereby the one or more segments are switched from allocation for low salinity or softened water EOR to allocation for disposal to provide additional injection capacity; or a combination thereof. Element 13: wherein PW overboarding in (j) includes treatment of the PW to be overboarded for the removal of oil therefrom. Element 14: wherein the low salinity or softened water is a low salinity water produced via reverse osmosis (RO), nanofiltration, or a combination thereof, or a softened water produced via nanofiltration, hardness ion precipitation, ion exchange, or a combination thereof. Element 15: wherein at least a portion of the softened water is produced from the PW.

Element 16: wherein the data further includes a low salinity stream capacity provided by the low salinity apparatus, a number of injection pumps available to inject low salinity EOR water from a low salinity EOR manifold or disposal water from a disposal manifold into a low salinity EOR header, a number of injection pumps available to inject low salinity water from a low salinity EOR manifold or disposal water from a disposal manifold into a disposal header, a maximum individual pump capacity, a minimum pump turndown rate, a target low salinity EOR injection salinity, a maximum acceptable or 'threshold' salinity for low salinity EOR, a produced water profile delay due to low salinity EOR, a low salinity EOR slug size as a fraction of pore volume (PV) for each of the low salinity EOR segments, a PV of each segment, a start date for injection of PW or low salinity EOR water for each segment, a start date for low salinity EOR water for each segment, or a combination thereof, and wherein the processor provides an output indicating a low salinity apparatus performance, injection header rates and salinities, injection pump and low salinity apparatus utilization, injection rates by segment, or a combination thereof. Element 17: wherein the processor identifies three pump utilization regimes: a first or 'good' regime indicating that each of the injection pumps is dedicated to one of the low salinity EOR header or the disposal header; a second or 'OK' regime indicating that an injection pump is being assigned to inject low salinity EOR into both the low salinity EOR header and the disposal header; and a third or 'Fail' regime indicating that an injection pump is assigned to inject the low salinity EOR water into the low salinity EOR header and disposal water into the disposal header. Element 18: further comprising increasing or decreasing injection to one or more segments to obtain a first or second regime for each of the injection pumps. Element 19: wherein, if the processor indicates excess low salinity EOR water is being sent to the disposal header, one or more additional segments of the reservoir can be allocated as low salinity EOR segments as such excess low salinity EOR water becomes available. Element 20: wherein the processor seeks to meet the following conditions, in addition to maintaining that the sum of the rates of disposal of PW in (a), (b), (c), and (d) equal the total production rate of PW: a total water injection rate into the one or more EOR segments of (a) and the one or more disposal segments of (b) is greater than or equal to an assumed PW re-injection rate equal to the projected total production rate of PW minus the rates of disposal of PW via (c) and (d); the low salinity EOR stream has a total salinity equal to a target salinity; a salinity in the low salinity EOR header is less than a threshold salinity for EOR; the low salinity water production apparatus has a low salinity stream capacity sufficient to provide the low salinity stream; the number of required injection pumps does not exceed the total number of available injection pumps; each of the injection pumps is operated above a minimum injection pump turndown rate; rates and salinities are greater than or equal to zero, or a combination thereof. Element 21: wherein the low salinity stream and the PW are distributed between a low salinity EOR header and a disposal header, wherein PW reinjected via (a) or (b) is primarily sent to a disposal header for disposal as per (b), and the low salinity produced in the low salinity apparatus is preferentially sent to a low salinity header for blending as a low salinity EOR stream as in (a). Element 22: wherein the low salinity apparatus comprises one or more reverse osmosis (RO) units, and wherein the processor takes into account a capacity of an RO unit to produce RO water, and a number of available RO units. Element 23: wherein the RO water is preferentially blended with PW, as in (a), blended with nanofiltration (NF) water should PW not be available, such as during initial stages of EOR, or both. Element 24: utilized for the design of a facility for low salinity EOR or for the analysis and/or reallocation of PW disposal routes, segments of a reservoir as low salinity EOR segments or disposal segments, or both within an existing low salinity EOR facility. Element 25: wherein the processor calculates a salinity of the low salinity EOR water for injection as per (a) and a salinity of the disposal water, and wherein one or more of the segments allocated for low salinity EOR injection are re-allocated for disposal if the evaluation indicates that the blended water in (a) has a salinity above a target salinity, or above a threshold EOR salinity.

Element 26: wherein the one or more non-reinjection pathways are selected from export with the produced oil, overboarding, or a combination thereof. Element 27: further comprising a PW treatment system comprising a de-oiling apparatus operable to reduce an oil concentration in the PW to less than or equal to about 40 ppm oil in water. Element 28: wherein the low salinity water production system comprises reverse osmosis, nanofiltration, precipitation of hardness ions, ion exchange, or a combination thereof. Element 29: wherein the low salinity water stream has a salinity of less than or equal to about 300 ppm, wherein the low salinity EOR stream has a target salinity of 1500 ppm, or both. Element 30: wherein introduction of PW into the low salinity header via the blend line produces a low salinity EOR stream having a salinity below a target salinity. Element 31: wherein the target salinity is less than 1500 ppm. Element 32: wherein the software further enables dynamic allocation of the one or more injection pumps from the low salinity header to the disposal header, whereby an injection capacity of the low salinity header and an injection capacity of the disposal header can be met. Element 33: wherein the software takes as inputs the total PW production rate, and, should allocation of the total PW for disposal via export with the produced oil, overboarding, introduction into the disposal injection header via the disposal line, and introduction into the low salinity injection header via the blend line result in a blended low salinity EOR stream having a salinity above a threshold salinity for EOR, allocates one or more segments of the reservoir previously allocated for low salinity EOR as a disposal segment, such that the blended low salinity EOR stream in the low salinity line maintains a salinity below the threshold salinity or equal to a target salinity, whereby low salinity EOR can be continued in the remaining segments allocated as low salinity segments.

While certain embodiments have been shown and described, modifications thereof can be made by one skilled in the art without departing from the teachings of this disclosure.

Numerous other modifications, equivalents, and alternatives, will become apparent to those skilled in the art once the above disclosure is fully appreciated. It is intended that the following claims be interpreted to embrace such modifications, equivalents, and alternatives where applicable. Accordingly, the scope of protection is not limited by the description set out above but is only limited by the claims which follow, that scope including equivalents of the subject matter of the claims.

What is claimed is:

1. A method of dynamically allocating a total amount of Produced Water (PW) from a reservoir during enhanced oil recovery (EOR) via a low salinity or softened water EOR flood, the method comprising:

receiving measurement data associated with a reservoir, a PW, and a low salinity or softened water, wherein the measurement data comprises: a PW production rate from the reservoir, a low salinity or softened water injection rate, an injection water compositional envelope, and a total water injection rate;

receiving reservoir configuration information comprising: one or more EOR injection zones, an EOR injection rate associated with each of the one or more EOR injection zones, one or more disposal injection zones, a disposal zone injection rate associated with each of the one or more disposal injection zones, one or more non-reinjection disposal routes, and a non-reinjection disposal rate associated with each of the one or more non-reinjection disposal routes;

determining a blending rate comprising at least a portion of the PW production rate and at least a portion of the low salinity or softened water injection rate to provide a blended injection fluid, wherein the blending rate maintains a composition of the blended injection fluid within the injection water compositional envelope; blending at least a portion of the PW with at least a portion of the low salinity or softened water at the blending rate to produce a blended injection fluid; and dynamically injecting a first portion of the PW and the blended injection fluid into the one or more EOR injection zones, into the one or more disposal injection zones, or a combination thereof;

dynamically disposing a second portion of the PW and the blended injection fluid through one or more non-reinjection disposal routes;

wherein the dynamic injection and dynamic disposal maintains the EOR injection rate, the disposal zone injection rate, and the non-reinjection disposal rate below predetermined thresholds, results in reinjection or non-reinjection disposal of the entire PW production rate, and meets a total voidage replacement rate whereby the sum total of the amount of water reinjected in (a) equals a voidage requirement.

2. The method of claim 1, wherein an amount of PW and the blended injection fluid dynamically injected into the reservoir is divided among one or more of:

(a) an amount of PW blended with a stream of the low salinity or softened water to provide a low salinity or softened water EOR stream having a salinity less than a target salinity for EOR and introduced as a slug of low salinity or softened water EOR into one or more segments of the reservoir allocated for secondary or tertiary low salinity or softened water EOR;

(b) an amount of PW utilized as a drive and/or pre-flush fluid that is injected into one or more segments of the reservoir allocated for low salinity or softened water EOR subsequent and/or prior to, respectively, the injection of a slug of low salinity or softened water EOR thereto;

(c) an amount of PW utilized in secondary recovery mode via injection into one or more segments of the reservoir allocated for tertiary low salinity or softened water EOR prior to injection of a slug of low salinity or softened water EOR thereto in tertiary recovery mode;

(d) an amount of PW injected via a disposal stream into one or more segments of the reservoir allocated for PW disposal;

(e) an amount of PW blended with a stream of the low salinity or softened water to provide a low salinity or softened water EOR stream having a salinity less than a threshold salinity for EOR, and introduced as a slug of low salinity or softened water EOR into one or more segments of the reservoir allocated for secondary or tertiary low salinity or softened water EOR; and (f) an amount of PW blended with a stream of the low salinity or softened water to provide a low salinity or softened water EOR stream having a salinity above the threshold salinity for EOR, and introduced into one or more segments of the reservoir;

wherein the amounts of PW allocated to each of (a), (b), (c), (d), (e), and (f) are maintained below injection limits for the associated one or more segments thereof.

3. The method of claim 2, wherein the slug of low salinity or softened water EOR has a pore volume of less than or equal to about 0.8.

4. The method of claim 2, wherein the dynamic disposal through one or more non-reinjection routes comprises (i) export in produced oil, (j) overboarding, or a combination thereof.

5. The method of claim 4, wherein the allocating prioritizes allocation of PW firstly to (i), penultimately to (j), and lastly to (f).

6. The method of claim 4, wherein (a) the amount of PW reinjected into the reservoir comprises (a), (d), (e), and (f), and wherein the water allocation prioritizes allocation of water in the order (i), (a), (d), (e), (j), (f).

7. The method of claim 4, wherein the amounts of PW reinjected via (a), (b), (c), (e), and (f) are injected into the associated one or more segments of the reservoir via a low salinity or softened water EOR manifold, a plurality of injection pumps, and a low salinity or softened water EOR header, and wherein the amount of PW reinjected via (d) for disposal is injected into the one or more segments of the reservoir allocated for disposal via a disposal manifold, the plurality of injection pumps and a disposal header.

8. The method of claim 7, wherein the plurality of injection pumps are fluidly connected with the low salinity or softened water EOR manifold and the disposal manifold, and fluidly connected with the low salinity or softened water header and with the disposal header.

9. The method of claim 7, wherein allocating further comprises taking into account a number of segments of the reservoir available for disposal, a number of segments of the reservoir available for low salinity or softened water EOR, injection requirements, including target and threshold salinities, flow rates, and pore volumes, for the low salinity or softened water EOR injected into low salinity or softened water EOR segments, an injection pump capacity for the disposal manifold, an injection pump capacity for the low salinity or softened water EOR manifold, a capacity of the low salinity or softened water header, a capacity of the disposal header, or a combination thereof.

10. The method of claim 1, wherein the low salinity or softened water is a low salinity water produced via reverse osmosis (RO), nanofiltration, or a combination thereof, or a softened water produced via nanofiltration, hardness ion precipitation, ion exchange, or a combination thereof.

11. The method of claim 10, wherein at least a portion of the softened water is produced from the PW.

* * * * *